(12) United States Patent
Kitamura et al.

(10) Patent No.: US 8,844,597 B2
(45) Date of Patent: Sep. 30, 2014

(54) METHOD AND DEVICE FOR MANUFACTURING SEAL FILM, METHOD OF MANUFACTURING INNER SEAL ATTACHMENT CONTAINER, INNER SEAL MEMBER, AND METHOD OF SEALING CAP ATTACHMENT CONTAINER USING THE SAME

(75) Inventors: Tomoko Kitamura, Yokohama (JP); Yasuharu Takada, Tokyo (JP); Tomoyuki Sasaki, Kawasaki (JP)

(73) Assignee: Fujimori Kogyo Co., Ltd. (JP)

( * ) Notice: Subject to any disclaimer, the term of this patent is extended or adjusted under 35 U.S.C. 154(b) by 1227 days.

(21) Appl. No.: 12/567,432

(22) Filed: Sep. 25, 2009

(65) Prior Publication Data
US 2010/0059473 A1    Mar. 11, 2010

Related U.S. Application Data

(63) Continuation of application No. PCT/JP2008/056100, filed on Mar. 28, 2008.

(30) Foreign Application Priority Data

| Mar. 28, 2007 | (JP) | P2007-083209 |
| Jan. 8, 2008 | (JP) | P2008-001514 |
| Jan. 9, 2008 | (JP) | P2008-002415 |
| Jan. 9, 2008 | (JP) | P2008-002416 |

(51) Int. Cl.
| B29C 65/00 | (2006.01) |
| B29C 65/02 | (2006.01) |
| B31F 1/00 | (2006.01) |
| B32B 38/00 | (2006.01) |
| B32B 38/04 | (2006.01) |
| B65D 53/04 | (2006.01) |
| B31D 1/00 | (2006.01) |
| B32B 3/02 | (2006.01) |
| B32B 3/04 | (2006.01) |
| B65D 53/08 | (2006.01) |
| B31B 1/00 | (2006.01) |

(52) U.S. Cl.
CPC .............. *B65D 53/04* (2013.01); *B32B 38/04* (2013.01); *B31B 2201/00* (2013.01); *B31B 2201/6073* (2013.01); *B31B 2201/9071* (2013.01); *B31B 2217/082* (2013.01); *B31D 1/0018* (2013.01); *B31D 1/0075* (2013.01); *B32B 3/02* (2013.01); *B32B 3/04* (2013.01); *B65D 53/08* (2013.01); *B31B 1/00* (2013.01)
USPC ........ 156/461; 156/443; 156/459; 156/477.1; 156/478; 156/479; 156/510; 156/516; 156/522

(58) Field of Classification Search
CPC .............. B31B 1/00; B31B 3/04; B31B 1/26; B31B 1/28; B31B 1/30; B31B 1/36; B31D 1/0018; B31D 1/0075; B32B 3/02; B32B 38/00; B32B 38/04
USPC .............. 156/443, 459, 461, 477.1, 478, 479, 156/510, 516, 522
See application file for complete search history.

(56) References Cited

U.S. PATENT DOCUMENTS

| 4,199,394 A | * | 4/1980 | Thompson | 156/461 |
| 4,666,052 A | | 5/1987 | Ou-Yang | |
| 4,754,890 A | * | 7/1988 | Ullman et al. | 215/232 |
| 4,762,246 A | * | 8/1988 | Ashley et al. | 220/270 |
| 5,433,992 A | | 7/1995 | Galda et al. | |
| 5,702,015 A | | 12/1997 | Giles et al. | |

FOREIGN PATENT DOCUMENTS

| CH | 475137 A | 7/1969 |
| JP | 3501599 A | 4/1991 |
| JP | 4503650 A | 7/1992 |
| JP | 6099912 A | 4/1994 |
| JP | 9150469 A | 6/1997 |
| JP | 2002179124 A | 6/2002 |
| JP | 2002543008 A | 12/2002 |
| JP | 2007145363 A | 6/2007 |

OTHER PUBLICATIONS

International Search Report; PCT/JP2008/056100: May 2, 2008; 4 pages.
European Search Report; Application No. EP 08 73 9218; Apr. 18, 2011; 7 pages.

* cited by examiner

Primary Examiner — Mark A Osele
Assistant Examiner — Christopher C Caillouet
(74) Attorney, Agent, or Firm — St. Onge Steward Johnston & Reens LLC

(57) ABSTRACT

A first base is interfolded along a folding line $1c$ extending in a flow direction thereof, one portion $1a$ of two portions divided by the folding line of the first base overlaps with a second base so as to be sealed thereto, a laminated structure formed by the first to third bases is punched into a predetermined shape so as to include the folding line portion, and a handle portion is formed by sealed portions of the first and second bases.

5 Claims, 22 Drawing Sheets

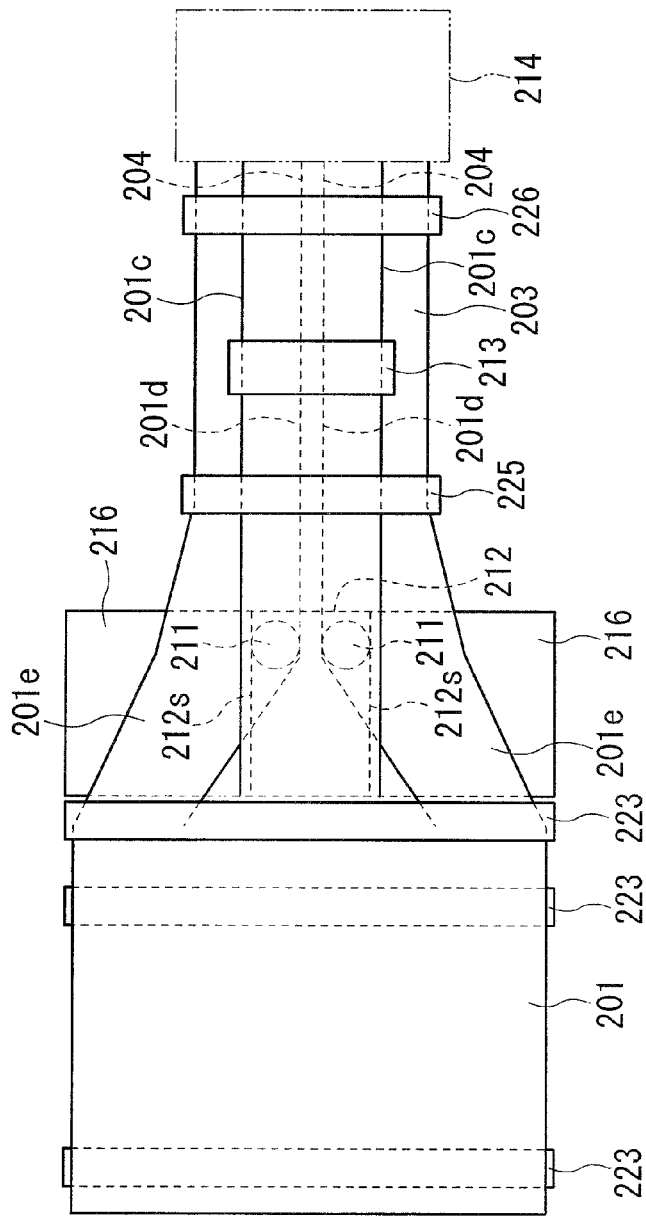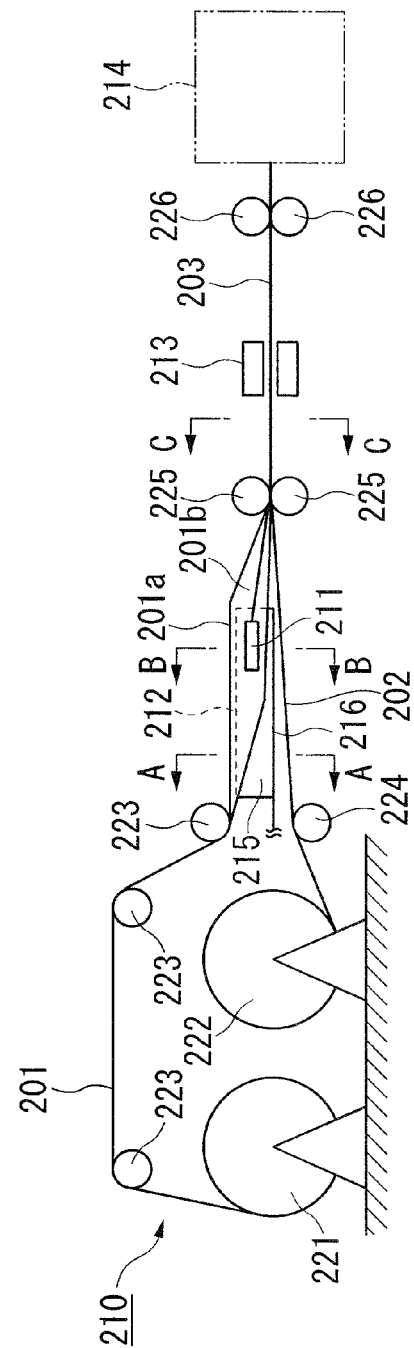
FIG. 14A
FIG. 14B

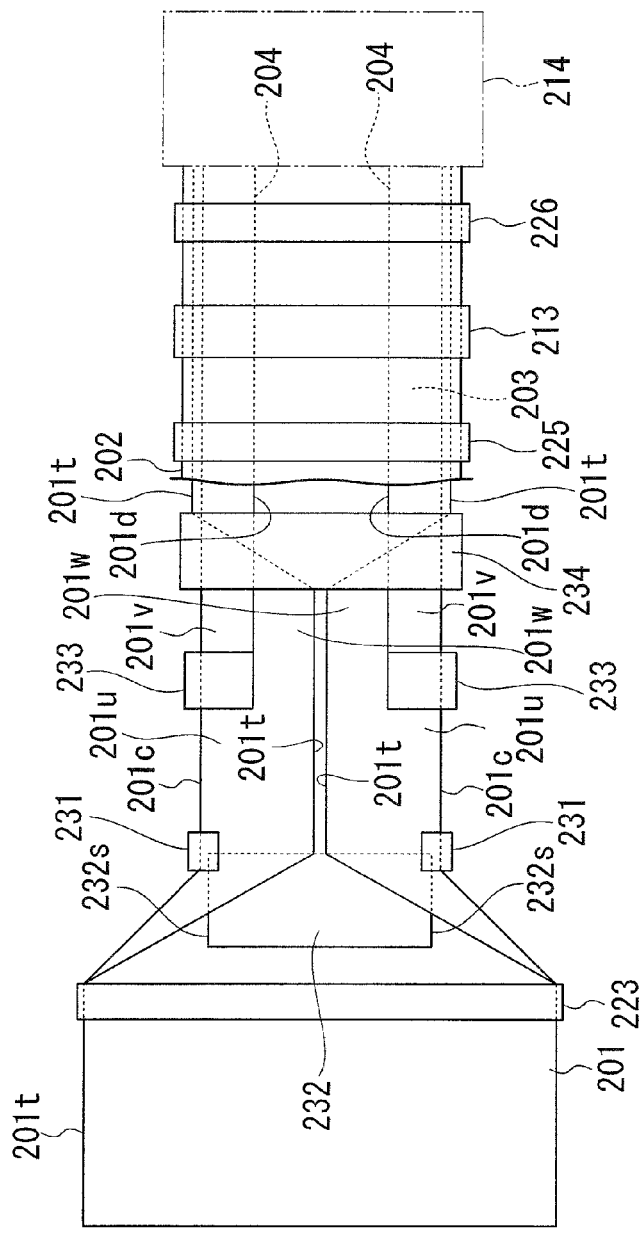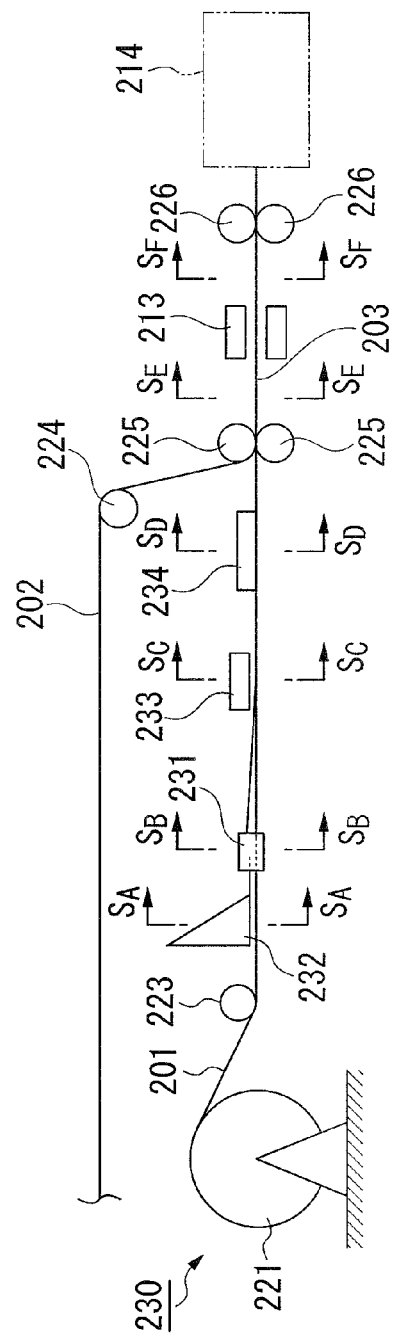
FIG. 24A
FIG. 24B

METHOD AND DEVICE FOR MANUFACTURING SEAL FILM, METHOD OF MANUFACTURING INNER SEAL ATTACHMENT CONTAINER, INNER SEAL MEMBER, AND METHOD OF SEALING CAP ATTACHMENT CONTAINER USING THE SAME

CROSS-REFERENCE TO RELATED APPLICATIONS

The present application is a continuation of pending International patent application PCT/JP2008/056100 filed on Mar. 28, 2008 which designates the United States and claims priority from Japanese patent application Nos. 2007-083209 filed on Mar. 28, 2007, 2008-001514 filed on Jan. 8, 2008, 2008-002415 filed on Jan. 9, 2008, and 2008-002416 filed on Jan. 9, 2008. All prior applications are herein incorporated by reference in their entirety.

FIELD OF THE INVENTION

The present invention relates to a method and device for manufacturing a seal film used for sealing an opening of a container. Also, the present invention relates to an inner seal member used for sealing an opening of a cap attachment container, and a method of sealing the cap attachment container using the same.

BACKGROUND OF THE INVENTION

In the past, as an inner seal for sealing an opening of a container in the inside of a cap, a seal film (inner seal member) having a diameter substantially equal to an outer diameter of the opening was widely used. As a handle portion used for peeling off the seal film at an opening time, there is known a technology in which an outer peripheral edge of the seal film is allowed to protrude in a cylindrical shape or a tongue-piece shape so as to use a portion protruding from the opening of the container as the handle portion.

In the case where the outer peripheral edge of the seal film is used as the handle portion, if a dimension of the handle portion is set to be large in order to easily grip the handle portion, the handle portion may be interposed between the container and the cap upon closing the cap on the opening of the container, which may cause an erroneous cap mounting state.

For this reason, there are proposed technologies in which the film is interfolded or adhered so that the handle portion does not protrude in the transverse direction from the opening of the container, but protrudes upward. For example see WO90/09932, WO00/66453, Japanese Patent Application No. 2002-179124 and WO89/02402.

In addition, there is known a technology in which a different member (tab liner layer) is inserted between an upper surface layer and a lower surface layer of the seal film, and the upper surface layer and the lower surface layer are adhered to each other at a position without the different member so that the handle portion formed by the tab liner layer and the upper surface layer does not protrude in the transverse direction from the opening of the container. For Example see Japanese Patent Publication No. H06-99912.

PROBLEM THAT THE INVENTION IS TO SOLVE

The known technologies have the following problems.
First, when the film is interfolded or adhered to form the handle portion, a difference in thickness occurs between a portion with the handle portion and a portion without the handle portion. Upon manufacturing the seal film having the handle portion, dimension matching or position matching is difficult due to the difference in thickness.

Second, when the different member is inserted to form the handle portion, it is difficult to control the adhesive strength between the upper surface layer and the lower surface layer of the seal film. When the amount of heat is too large, heat deterioration or dimensional shrinkage occurs in the seal film. When the amount of heat is too small, peeling or the like occurs. In addition, the upper surface layer, the lower surface layer, the different member, and the types of materials used increase.

Third, when an interfolding line is formed by a protrusion attachment roller to form the handle portion, in order to change an interfolding amount for controlling the size of the handle portion, it is necessary to provide other rollers having different protrusion shapes or sizes, and it is necessary to perform a roller exchanging operation or the like, which requires effort and expenditure.

Fourth, when the film is interfolded or adhered to form the handle portion, since the opening is closed by the cap while not in use, when the cap is separated to peel off the inner seal, the handle portion is formed in a shape which is substantially parallel to the top surface of the inner seal and does not protrude from the container opening. Accordingly, it is difficult to grip the handle portion.

SUMMARY OF THE INVENTION

The present invention is contrived in consideration of the above-described circumstances, and an object of the invention is to provide a method capable of easily manufacturing a seal film having a handle portion. Also, an object of the invention is to provide a method of manufacturing a seal film, capable of reliably manufacturing the seal film having the handle portion and manufacturing the seal film in which the types of materials used are small. Also, an object of the invention is to provide a method and device for manufacturing the seal film, which is capable of manufacturing the seal film by easily changing a dimension of the handle portion. Also, an object of the invention is to provide an inner seal member of which the handle portion can be easily gripped at an opening time.

MEANS FOR SOLVING THE PROBLEM

In order to solve the problems, according to Aspect 1 of the invention, there is provided a method of manufacturing a seal film, the method including: interfolding a first base formed of an elongated film having a sealant layer formed on one surface thereof along a folding line extending in a flow direction of the first base so that the opposite surfaces of the sealant layer face each other; overlapping one portion of two portions divided by the folding line of the first base with a second base formed of an elongated film having a sealant layer formed on one surface thereof so that the sealant layers of both bases face each other; sealing the one portion of the first base to the second base; punching a laminated structure, formed by sealing the first and second bases to each other, into a predetermined shape so that the folding line portion is included in a punching area; and manufacturing a handle portion formed by the sealed portions of the first and second bases.

According to Aspect 2 of the invention, there is provided a method of manufacturing a seal film, the method including: interfolding a first base formed of an elongated film having a sealant layer formed on one surface thereof along a folding line extending in a flow direction of the first base so that the opposite surfaces of the sealant layer face each other; overlapping one portion of two portions divided by the folding line of the first base with a second base formed of an elongated film having a sealant layer formed on one surface thereof so that the sealant layers of both bases face each other; sealing the one portion of the first base to the second base; overlapping portions of the first and second bases which are not sealed to each other with a third base formed of an elongated film having a sealant layer formed on at least one surface thereof so that the sealant layers thereof face each other; sealing the other portion except for the one portion of the first base to the third base; sealing a portion of the second base which is not sealed to the first base to the third base; punching a laminated structure, formed by sealing the first to third bases to each other, into a predetermined shape so that the folding line portion is included in a punching area; and manufacturing a handle portion formed by the sealed portions of the first and second bases.

According to Aspect 3 of the invention, there is provided a method of manufacturing an inner seal attachment container, the method including: interfolding a first base formed of an elongated film having a sealant layer formed on one surface thereof along a folding line extending in a flow direction of the first base so that the opposite surfaces of the sealant layer face each other; overlapping one portion of two portions divided by the folding line of the first base with a second base formed of an elongated film having a sealant layer formed on one surface thereof so that the sealant layers of both bases face each other; sealing the one portion of the first base to the second base; punching a laminated structure, formed by sealing the first and second bases to each other, into a shape of a seal film so that the folding line portion is included in a punching area; manufacturing a handle portion formed by the sealed portions of the first and second bases; placing a third base formed in the same shape as the punching shape of the seal film and having sealant layers formed on both surfaces thereof and a metal layer formed therein directly on a peripheral edge of a container opening or via a fourth base having both sealable surfaces interposed therebetween; placing unsealed portions of the first and second bases of the seal film having the handle portion on the third base; mounting a cap to the container opening; and sealing a gap from the seal film to the peripheral edge of the container opening through a high-frequency induction heating process in the state where the seal film comes into press contact with the peripheral edge of the container opening in the inside of the cap.

According to Aspect 4 of the invention, there is provided a method of manufacturing an inner seal attachment container, the method including: interfolding a first base formed of an elongated film having a sealant layer formed on one surface thereof along a folding line extending in a flow direction of the first base so that the opposite surfaces of the sealant layer face each other; overlapping one portion of two portions divided by the folding line of the first base with a second base formed of an elongated film having a sealant layer formed on one surface thereof so that the sealant layers of both bases face each other; sealing the one portion of the first base to the second base; overlapping portions of the first and second bases which are not sealed to each other with a third base formed of an elongated film having sealant layers formed on both surfaces thereof and a metal layer formed therein so that the sealant layers thereof face each other; sealing the other portion except for the one portion of the first base to the third base; sealing a portion of the second base which is not sealed to the first base to the third base; punching a laminated structure, formed by sealing the first to third bases to each other, into a shape of a seal film so that the folding line portion is included in a punching area; manufacturing a handle portion formed by the sealed portions of the first and second bases; placing the seal film having the handle portion directly on a peripheral edge of a container opening or via a fourth base having both sealable surfaces interposed therebetween; mounting a cap to the container opening; and sealing a gap from the seal film to the peripheral edge of the container opening through a high-frequency induction heating process in the state where the seal film comes into press contact with the peripheral edge of the container opening in the inside of the cap.

According to Aspect 5 of the invention, there is provided a method of manufacturing a seal film, the method including: preparing a first base formed of an elongated film having a sealant layer formed on one surface thereof and a second base formed of an elongated film having a sealant layer formed on at least one surface thereof; interfolding a part of an end portion of the first base along a folding line extending in a flow direction of the first base so that the surfaces of the sealant layers face each other; overlapping a side of the first base having a folding back portion with the sealant layer of the second base so as to face each other; sealing the first and second bases to each other; punching a laminated structure formed by the sealing into a predetermined shape so that the folding back portion of the first base is included in a punching area; and manufacturing a handle portion formed by the sealed portion of the first base.

Aspect 6 of the invention provides the method according to Aspect 5, wherein the sealant layers of the bases are formed of the same resin.

Aspect 7 of the invention provides the method according to Aspect 5, wherein the opposite surface of the sealant layer of the second base is formed as an easy peel layer.

Aspect 8 of the invention provides the method according to Aspect 5, wherein the second base has a heating layer heated by high frequency.

According to Aspect 9 of the invention, there is provided a method of manufacturing a seal film, the method including: preparing a first base formed of an elongated film having a sealant layer formed on one surface thereof, a second base formed of an elongated film having a sealant layer formed on at least one surface thereof, and a third base formed of an elongated film having the same configuration as that of the first base and having a width narrower than those of the first and second bases; allowing the sealant layer of the first base to face the sealant layer of the second base; inserting the third base between the first and second bases; sealing overlapping portions of the first to third bases to an area having overlapping portions of the first and second bases; punching a laminated structure formed by the sealing into a predetermined shape so that an one-side end portion of the third base is included in a punching area; and manufacturing a handle portion formed by the first base on the side of the third base or manufacturing a handle portion formed by the sealed portions of the first and third bases.

Aspect 10 of the invention provides the method according to Aspect 9, wherein in the process of manufacturing the seal film, the first base is sent out and slitted so as to supply the third base.

Aspect 11 of the invention provides the method according to Aspect 9, wherein the sealant layers of the bases are formed of the same resin.

Aspect 12 of the invention provides the method according to Aspect 9, wherein the opposite surface of the sealant layer of the second base is formed as an easy peel layer.

Aspect 13 of the invention provides the method according to Aspect 9, wherein the second base has a heating layer heated by high frequency.

According to Aspect 14 of the invention, there is provided a method of manufacturing a seal film, the method including: allowing a first base to come into contact with an interfolding plate at a position deviating from an interfolding assisting plate in the state where the first base formed of an elongated film having a sealant layer formed on one surface thereof follows the interfolding assisting plate; interfolding the first base so as to have an S-shaped, Z-shaped, or Ω-shaped interfolding shape in a sectional view in a flow direction of the first base; overlapping a second base formed of an elongated film having a sealant layer formed on at least one surface thereof with the first base having the interfolding shape so that the sealant layers of both bases face each other; sealing the first base to the second base; punching a laminated structure, formed by sealing the first and second bases to each other, into a predetermined shape so that a folding line portion of the first base contacting with the second base is included in a punching area; and manufacturing a handle portion formed by the sealed portion of the first base.

Aspect 15 of the invention provides the method according to Aspect 14, wherein the interfolding plate is a rotary disk.

Aspect 16 of the invention provides the method according to Aspect 14, wherein the interfolding plate and the interfolding assisting plate are horizontally provided.

According to Aspect 17 of the invention, there is provided a method of manufacturing a seal film, the method including: allowing an interfolding plate to come into contact with a first base in the state where the first base formed of an elongated film having a sealant layer formed on one surface thereof follows an interfolding assisting plate; interfolding the first base so as to have an outward mountain-folding shape in the width direction in a sectional view in a flow direction of the first base; sealing a folding back portion formed in the mountain-folding shape so as to form a sealed portion of the first base; allowing an unsealed portion of an end portion of the first base to come into contact with a folding back plate; folding back the sealed portion of the first base so as to have an outward valley-folding shape in the width direction in the sectional view in the flow direction of the first base; allowing the first base to have an S-shaped, Z-shaped, or Ω-shaped interfolding shape in the sectional view in the flow direction of the first base; overlapping a second base formed of an elongated film having a sealant layer formed on at least one surface thereof with the first base having the interfolding shape so that the sealant layers of both bases face each other; sealing the first base to the second base; punching a laminated structure, formed by sealing the first and second bases to each other, into a predetermined shape so that a folding line portion of the first base contacting with the second base is included in a punching area; and manufacturing a handle portion formed by the sealed portion of the first base.

Aspect 18 of the invention provides the method according to Aspect 17, wherein the interfolding plate and the interfolding assisting plate are horizontally provided.

According to Aspect 19 of the invention, there is provided a device for manufacturing a seal film, the device including: an interfolding assisting plate which supports a first base formed of an elongated film having a sealant layer formed on one surface thereof; an interfolding plate which comes into contact with the first base at a position deviated from the interfolding assisting plate in the state where the first base follows the interfolding assisting plate so that the first base is interfolded to have an S-shaped, Z-shaped, or Ω-shaped interfolding shape in a sectional view in a flow direction of the first base; sealing means which overlaps a second base formed of an elongated film having a sealant layer formed on at least one surface thereof with the first base having the interfolding shape so that the sealant layers of both bases face each other and seals the first base to the second base; and punching means which punches a laminated structure, formed by sealing the first and second bases to each other, into a predetermined shape so that a folding line portion of the first base contacting with the second base is included in a punching area and forms a handle portion formed by the sealed portion of the first base.

Aspect 20 of the invention provides the device according to Aspect 19, wherein the interfolding plate is a rotary disk.

Aspect 21 of the invention provides the device according to Aspect 19, wherein the interfolding plate is movable.

Aspect 22 of the invention provides the device according to Aspect 19, wherein the interfolding plate and the interfolding assisting plate are horizontally provided.

Aspect 23 of the invention provides the device according to Aspect 19, wherein a width of the interfolding assisting plate is variable.

According to Aspect 24 of the invention, there is provided a device for manufacturing a seal film, the device including: an interfolding assisting plate which comes into contact with a first base formed of an elongated film having a sealant layer formed on one surface thereof; an interfolding plate which comes into contact with the first base in the state where the first base follows the interfolding assisting plate and interfolds the first base so as to have an outward mountain-folding shape in the width direction in a sectional view in a flow direction of the first base; first sealing means which seals a folding back portion having the mountain-folding shape and forms a sealed portion of the first base; a folding back plate which comes into contact with an unsealed portion of an end portion of the first base, folds back a sealed portion of the first base so as to have an outward valley-folding shape in the width direction in a sectional view in a flow direction of the first base, and then allows the first base so as to have an S-shaped, Z-shaped, or Ω-shaped interfolding shape in the sectional view in the flow direction of the first base; second sealing means which overlaps a second base formed of an elongated film having a sealant layer formed on at least one surface thereof with the first base having the interfolding shape so that the sealant layers of both bases face each other and seals the first base to the second base; and punching means which punches a laminated structure, formed by sealing the first and second bases to each other, into a predetermined shape so that a folding line portion of the first base contacting with the second base is included in a punching area and forms a handle portion formed by the sealed portion of the first base.

Aspect 25 of the invention provides the device according to Aspect 24, wherein the interfolding plate and the interfolding assisting plate are horizontally provided.

Aspect 26 of the invention provides the device according to Aspect 24, wherein a width of the interfolding assisting plate is variable.

According to Aspect 27 of the invention, there is provided an inner seal member including: a handle portion which is formed in a shape not protruding from a container opening, wherein a sealant layer of a base manufacturing the handle portion is exposed to a part of a front end of the handle portion.

Aspect 28 of the invention provides the inner seal member according to Aspect 27, wherein a base having a heating layer heated by high frequency is provided in the inner seal member on the side of the container opening.

According to Aspect 29 of the invention, there is provided a method of sealing a cap attachment container, the method including: placing the inner seal member according to Aspect 28 on a container opening; mounting a cap to the container opening; and sealing the inner seal member to the container opening through high-frequency sealing process in the state where the inner seal member is accommodated in the inside of the cap.

According to Aspect 30 of the invention, there is provided the method according to Aspect 29, in the inner seal member, a sealant layer of a base manufacturing the handle portion is exposed to a part of a front end of the handle portion, and wherein during the high-frequency sealing process, the front end of the handle portion is melt-fixed to an inner-side ceiling surface of the cap through the exposed sealant layer.

According to Aspect 31 of the invention, there is provided a method of sealing a cap attachment container, the method including: placing a base having a heating layer heated by high frequency on a container opening; placing the inner seal member according to Aspect 27 thereon; mounting a cap to the container opening; and sealing the inner seal member to the container opening through the base having the heating layer by a high-frequency sealing process in the state where the base having the heating layer and the inner seal member are accommodated in the inside of the cap.

Aspect 32 of the invention provides the method according to Aspect 31, wherein in the inner seal member, a sealant layer of a base manufacturing the handle portion is exposed to a part of a front end of the handle portion, and wherein during the high-frequency sealing process, the front end of the handle portion is melt-fixed to an inner-side ceiling surface of the cap through the exposed sealant layer.

According to Aspect 33 of the invention, there is provided an inner seal member including: a handle portion which is formed in a shape not protruding from a container opening, wherein the handle portion is formed by laminating a part of a first base on an one-side portion of a second base divided into two portions by a folding line, and wherein compressive strength using a ring crush method prescribed in JIS P8126 of the second base is larger than that of the first base.

Aspect 34 of the invention provides the inner seal member according to Aspect 33, wherein a base having a heating layer heated by high frequency is provided in the inner seal member on the side of the container opening.

According to Aspect 35 of the invention, there is provided a method of sealing a cap attachment container, the method including: placing the inner seal member according to Aspect 34 on a container opening; mounting a cap to the container opening; and sealing the inner seal member to the container opening by a high-frequency sealing process in the state where the inner seal member is accommodated in the inside of the cap.

Aspect 36 of the invention provides the method according to Aspect 35, wherein in the inner seal member, a sealant layer of a base manufacturing the handle portion is exposed to a part of a front end of the handle portion, and wherein during the high-frequency sealing process, the front end of the handle portion is melt-fixed to an inner-side ceiling surface of the cap through the exposed sealant layer.

According to Aspect 37 of the invention, there is provided a method of sealing a cap attachment container, the method including: placing a base having a heating layer heated by high frequency on a container opening; placing the inner seal member according to Aspect 33 thereon; mounting a cap on the container opening; and sealing the inner seal member to the container opening through the base having the heating layer by a high-frequency sealing process in the state where the base having the heating layer and the inner seal member are accommodated in the inside of the cap.

Aspect 38 of the invention provides the method according to Aspect 37, wherein in the inner seal member, a sealant layer of a base manufacturing the handle portion is exposed to a part of a front end of the handle portion, and wherein during the high-frequency sealing process, the front end of the handle portion is melt-fixed to an inner-side ceiling surface of the cap through the exposed sealant layer.

According to Aspect 39 of the invention, there is provided an inner seal member including: a handle portion which is formed in a shape not protruding from a container opening, wherein the handle portion is formed by laminating a part of a first base on an one-side portion of a second base divided into two portions by a folding line, wherein compressive strength using a ring crush method prescribed in JIS P8126 of the second base is larger than that of the first base, and wherein a sealant layer of a base manufacturing the handle portion is exposed to a part of a front end of the handle portion.

Aspect 40 of the invention provides the inner seal member according to Aspect 39, wherein a base having a heating layer heated by high frequency is provided in the inner seal member on the side of the container opening.

According to Aspect 41 of the invention, there is provided a method of sealing a cap attachment container, the method including: placing the inner seal member according to Aspect 40 on a container opening; mounting a cap to the container opening; and sealing the inner seal member to the container opening by a high-frequency sealing process in the state where the inner seal member is accommodated in the inside of the cap.

Aspect 42 of the invention provides the method according to Aspect 41, wherein in the inner seal member, a sealant layer of a base manufacturing the handle portion is exposed to a part of a front end of the handle portion, and wherein during the high-frequency sealing process, the front end of the handle portion is melt-fixed to an inner-side ceiling surface of the cap through the exposed sealant layer.

According to Aspect 43 of the invention, there is provided a method of sealing a cap attachment container, the method including: placing a base having a heating layer heated by high frequency on a container opening; placing the inner seal member according to Aspect 39 thereon; mounting a cap to the container opening; and sealing the inner seal member to the container opening through the base having the heating layer by a high-frequency sealing process in the state where the base having the heating layer and the inner seal member are accommodated in the inside of the cap.

Aspect 44 of the invention provides the method according to Aspect 43, wherein in the inner seal member, the sealant layer of the base manufacturing the handle portion is exposed to a part of a front end of the handle portion, and wherein during the high-frequency sealing process, the front end of the handle portion is melt-fixed to an inner-side ceiling surface of the cap through the exposed sealant layer.

ADVANTAGE OF THE INVENTION

According to the method of manufacturing the seal film of the invention, since the bases overlap with each other and are punched so as to form the handle portion, it is possible to form the handle portion which does not protrude, and it is easy to form the large handle portion which can be easily gripped.

According to the invention, it is possible to form the seal film by using two types of bases. In addition, since the sealant layers are formed of the same resin, it is easy to set the sealing condition and to obtain the reliable quality.

According to the invention, since it is possible to change the size of the handle portion of the seal film or to change the number of sheets of the handle portions by changing the position of the interfolding plate, the sealing width of the mountain-shaped folding back portion, or the width of the interfolding assisting plate, it is possible to easily form the handle portion having a different size and a different number of sheets as occasion demands. Particularly, according to the seal film manufacturing device having the movable interfolding plate and/or the interfolding assisting plate of which the width is variable, since the position change of the interfolding plate and/or the width change of the interfolding assisting plate are easy to achieve, it is possible to form the seal film provided with the handle portion having a different size and a different number of sheets by using the same seal film manufacturing device.

According to the inner seal member of the invention, since the sealant layer is exposed to a part of the front end of the handle portion, it is possible to melt-fix a part of the front end of the handle portion to the cap upon melt-fixing the inner seal member. Accordingly, it is possible to allow the handle portion to stand up upon separating the cap.

In addition, since the handle portion is formed by two types of bases having different compressive strengths, it is possible to allow the handle portion to stand up upon separating the cap due to the difference in compressive strength. For this reason, it is easy to grip the handle portion upon peeling the inner seal member off so as to be opened.

BRIEF DESCRIPTION OF THE DRAWINGS

FIG. 14A is a plan diagram showing a device manufacturing a seal film according to the seventh embodiment of the invention.

FIG. 14B is a front diagram showing the seal film manufacturing device according to the seventh embodiment of the invention.

FIG. 24A is a plan diagram showing the seal film manufacturing device according to the eighth embodiment of the invention.

FIG. 24B is a front diagram showing the seal film manufacturing device according to the eighth embodiment of the invention.

DETAILED DESCRIPTION OF THE INVENTION

Hereinafter, on the basis of plural embodiments of the invention, the invention will be described with reference to the drawings.

First, the first to fourth embodiments of the invention will be described in detail with reference to FIGS. 1A to 11.

Figure 3:
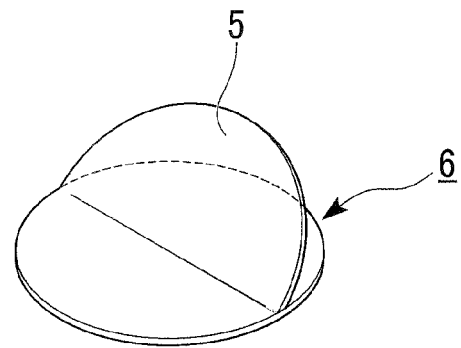
FIG. 3 is a perspective diagram showing an example of a seal film.
Figure 4:
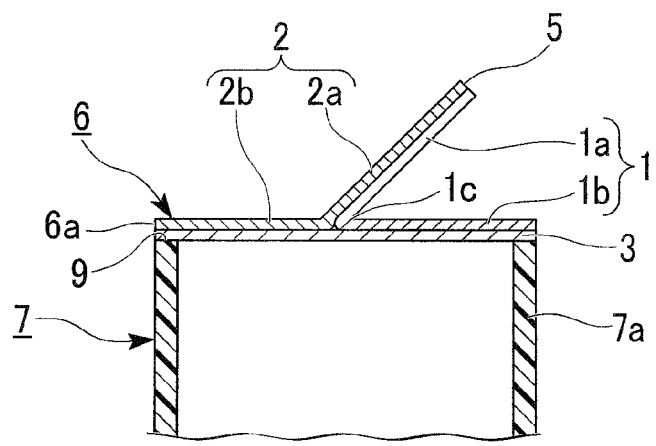
FIG. 4 is a sectional diagram showing an example of a shape in which an opening of a container is sealed by the seal film.
Figure 5:
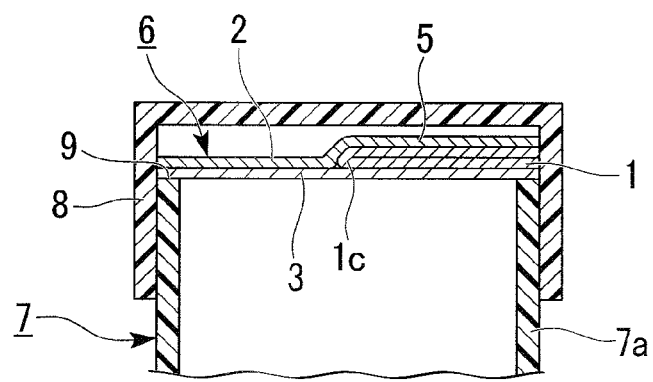
FIG. 5 is a sectional diagram showing an example of a shape in which an opening of a cap attachment container is sealed by the seal film.

FIGS. 1A to 1D are sectional process diagrams illustrating a method of manufacturing a seal film according to the first embodiment of the invention. FIGS. 2A to 2D are sectional process diagrams illustrating the method of manufacturing the seal film according to the second embodiment of the invention. FIG. 3 is a perspective view showing an example of a seal film. FIG. 4 is a sectional view showing an example of a shape in which an opening of a container is sealed by the seal film. FIG. 5 is a sectional view showing an example of a shape in which an opening of a cap attachment container is sealed by the seal film.

The method of manufacturing the seal film according to the embodiments is to form a seal film having a handle portion by the following steps (1) and (2).

Figure 1A:
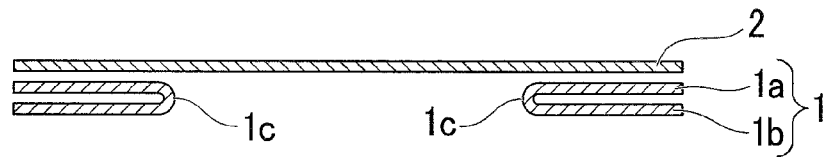
FIG. 1A is a sectional process diagram illustrating a method of manufacturing a seal film according to the first embodiment of the invention.
Figure 1B:
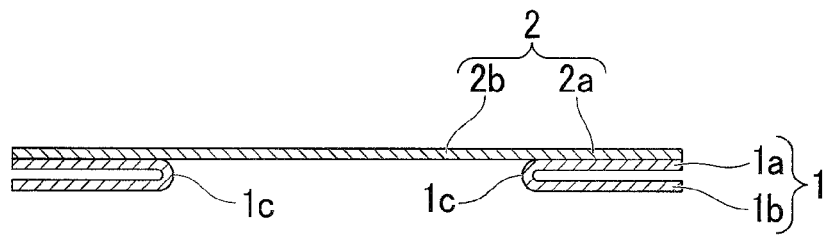
FIG. 1B is a sectional process diagram illustrating the method of manufacturing the seal film according to the first embodiment of the invention.
Figure 2A:
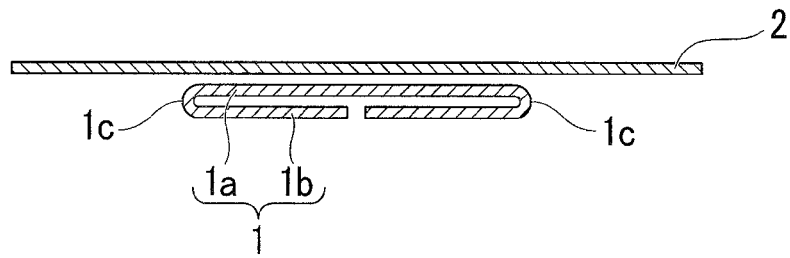
FIG. 2A is a sectional process diagram illustrating the method of manufacturing the seal film according to the second embodiment of the invention.
Figure 2B:
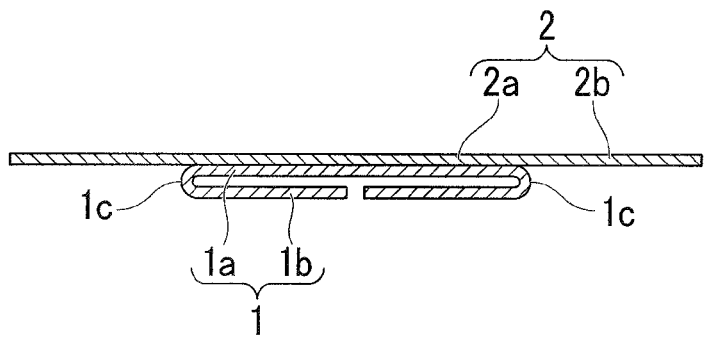
FIG. 2B is a sectional process diagram illustrating the method of manufacturing the seal film according to the second embodiment of the invention.

(1) As shown in FIGS. 1A and 2A, a first base 1 formed of an elongated film having a sealant layer formed on one surface thereof is interfolded along a folding line 1c extending in a flow direction thereof so that the opposite surfaces of the sealant layer face each other. As shown in FIGS. 1B and 2B, one portion 1a of two portions 1a and 1b divided by the folding line 1c of the first base 1 overlaps with a second base 2 formed of an elongated film having a sealant layer formed on one surface thereof so that the sealant layers of both bases 1 and 2 face each other. Then, one portion 1a of the first base 1 is sealed to the second base 2.

Figure 1C:
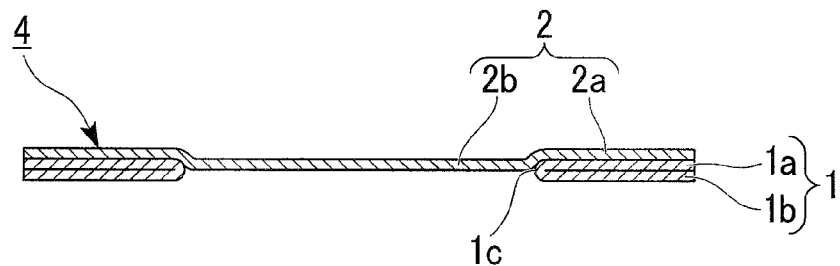
FIG. 1C is a sectional process diagram illustrating the method of manufacturing the seal film according to the first embodiment of the invention.
Figure 2C:
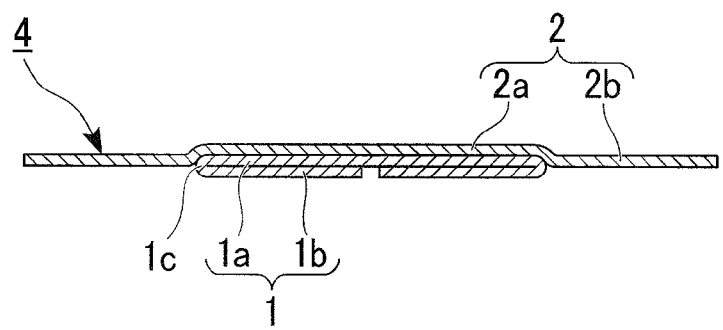
FIG. 2C is a sectional process diagram illustrating the method of manufacturing the seal film according to the second embodiment of the invention.

Accordingly, as shown in FIGS. 1C and 2C, it is possible to obtain a laminated structure 4 which is formed by sealing the first and second bases to each other.

In addition, in FIGS. 1B and 2B, when a heat sealing operation is performed by using a hot plate, in order to prevent the sealant layers of the first and second bases 1 and 2 which are not sealed to each other from being melt-fixed to the hot plate or the like, it is desirable that a film (a polyethylene terephthalate (PET) film, a nylon film, a film or sheet treated by fluorine or silicon, or the like) which is not melt-fixed to the sealant layer be interposed on the sealant layer of the unsealed portion.

When an elongated film which is the same as the first and second bases 1 and 2 is used as the film which is not melt-fixed to the sealant layer, it is possible to transport the film together with the bases 1 and 2 in an overlapping state.

Figure 1D:
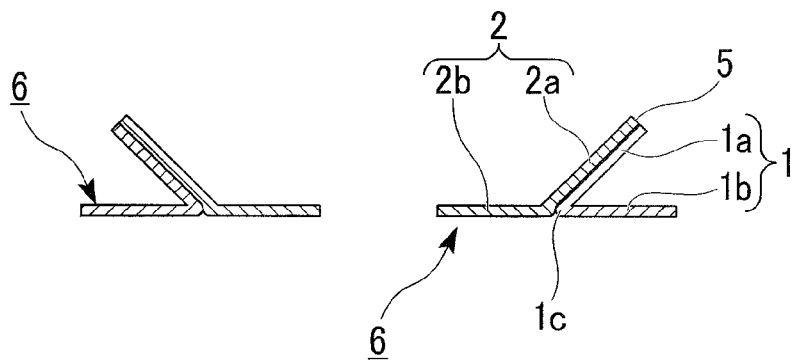
FIG. 1D is a sectional process diagram illustrating the method of manufacturing the seal film according to the first embodiment of the invention.
Figure 2D:
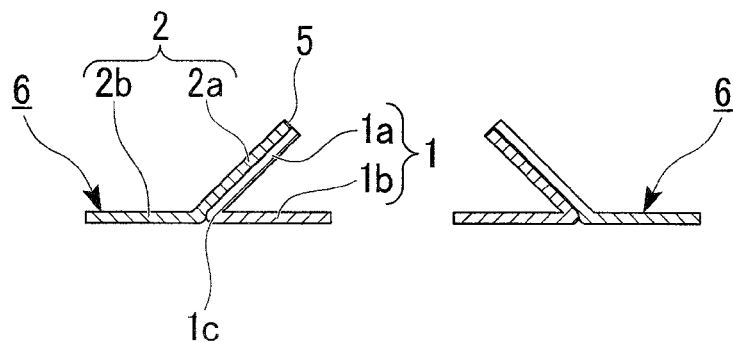
FIG. 2D is a sectional process diagram illustrating the method of manufacturing the seal film according to the second embodiment of the invention.

(2) As shown in FIGS. 1D and 2D, the laminated structure 4 is punched into a predetermined shape so that a portion of the folding line 1c is included in a punching area, thereby manufacturing a handle portion 5 consisting of the portions 1a and 2a of the first and second bases 1 and 2 sealed to each other. Accordingly, as shown in FIG. 3, it is possible to obtain a seal film 6 having the handle portion 5.

In the embodiment, as shown in FIGS. 1A to 1D, two sheets of the first bases 1 may be provided so as to correspond to the respective side edges of the second base 2. In addition, as shown in FIGS. 2A to 2D, the folding lines 1c may be formed at two positions of the first base 1 so that the one portion 1a sealed to the second base 2 is formed in the both side edges of the first base 1. According to this example, since the folding lines 1c are formed at two positions of the laminated structure 4 of the respective bases, it is possible to form the seal film punched in two rows.

In the case where the opening sealed by the seal film is provided in a cylindrical portion 7a which is formed to have the opening in the front end thereof as shown in FIG. 4, it is desirable that the shape punching the seal film be formed to have a diameter substantially equal to an outer diameter of the cylindrical portion 7a so that the outward protruding amount thereof is as small as possible. In addition, in the case where the opening sealed by the seal film is opened in a flat wall surface, it is desirable that the punching shape be formed to have a size in which a sealing width is ensured on the outside of the opening.

As shown in FIG. 4, it is possible to use the seal film 6 formed by the embodiment as a seal for closing the opening in such a manner that an outer peripheral edge 6a is sealed to a peripheral edge 9 of the opening of the container 7. In addition, it is possible to use the seal film 6 as an inner seal used inside a cap 8 in the case where the cap 8 is mounted to the cylindrical portion of the container 7.

Further, in the case where an inner seal attachment container is formed by using the seal film 6 according to the embodiment, as shown in FIG. 5, a method may be used which places a third base 3 having sealant layers formed on both surfaces thereof to have a shape which is the same as the punching shape of the seal film 6 and a metal layer formed therein on the peripheral edge 9 of the opening of the container 7; places the unsealed portion of the first and second bases 1 and 2 of the seal film 6 having the handle portion 5 on the third base 3; mounts the cap 8 to the opening of the container; and seals a gap between the seal film 6 and the third base 3 and between the third base 3 and the peripheral edge 9 of the opening of the container through high-frequency induction heating process in the state where the third base 3 and the seal film 6 comes into press contact with the peripheral edge 9 of the opening of the container inside the cap 8.

Accordingly, since the seal film 6 is positioned to the peripheral edge 9 of the opening of the container by means of the inner surface of the cap 8, it is possible to easily perform the alignment of the seal film 6. In this case, in order to allow the high frequency to arrive at the metal layer inside the third base 3, at least the cylindrical portion 7a of the container 7 and the cap 8 are formed of an insulating material such as plastic.

As a method of placing the third base 3 and the seal film 6 on the peripheral edge 9 of the opening of the container, desirably, a method may be used which sequentially loads the seal film 6 having the handle portion 5 facing downward and the third base 3 in the inside of the cap 8 in advance, and mounts the cap 8 loaded with the seal film 6 and the third base 3 to the opening of the container.

According to this method, it is possible to easily perform the method using an automatic machine compared with a method which places the third base 3 and the seal film 6 on the peripheral edge 9 of the opening of the container and mounts the cap 8 thereto.

In the case of opening the container, it is possible to easily open the container by gripping the handle portion 5 of the seal film 6 using a finger or the like to be separated therefrom. In the case of the seal film 6 formed by the invention, as shown in FIG. 4, since the handle portion 5 is formed so as to protrude upward from the opening of the container, it is easy to grip the handle portion 5.

Figure 6A:
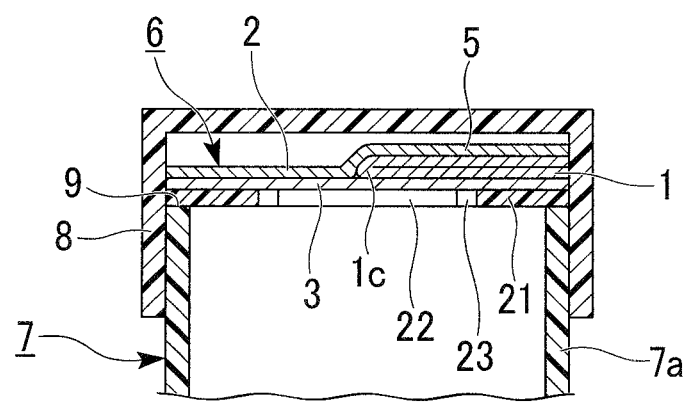
FIG. 6A is a sectional diagram showing an example of a shape in which a fourth base is provided in the opening of the cap attachment container and the opening is sealed by the seal film.

Further, in the case of manufacturing the inner seal attachment container using the seal film 6 according to the embodiment, instead of directly placing the seal film 6 on the peripheral edge 9 of the opening of the container, as shown in FIG. 6A, a fourth base 21 having both sealable surfaces may be interposed between the third base 3 and the peripheral edge 9 of the opening of the container, and the third base 3 and the seal film 6 may be placed thereon.

In this case, the seal film 6 having the handle portion 5 facing downward, the third base 3 formed in the same shape as the punching shape of the seal film 6 and having the sealant layers formed on both surfaces thereof and the metal layer formed therein, and the fourth base 21 having both sealable surfaces are sequentially loaded in the inside of the cap 8; the cap 8 loaded with the seal film 6 and the third base 3, and the fourth base 21 loaded on the seal film 6 is mounted to the opening of the container 7; and the high-frequency induction heating process is performed in the state where the seal film 6 comes into press contact with the peripheral edge 9 of the opening of the container inside the cap 8.

Accordingly, a gap (a gap between the lower surface of the seal film 6 and the upper surface of the third base 3, a gap between the lower surface of the third base 3 and the upper surface of the fourth base 21, and a gap between the lower surface of the fourth base 21 and the peripheral edge 9 of the opening of the container) from the seal film 6 to the peripheral edge 9 of the opening of the container is sealed by heat generated by high frequency from the inside of the third base 3.

Figure 6B:
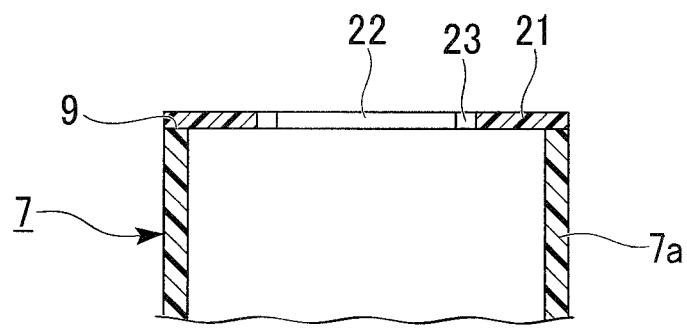
FIG. 6B is a sectional diagram showing a shape in which the seal film is separated from the container in FIG. 6A.

The fourth base 21 is formed of a sealable member such as a thermoplastic resin, but particularly, it is desirable that seal strength between the fourth base 21 and the peripheral edge 9 of the opening of the container be strong. Accordingly, after separating the seal film 6 by gripping the handle portion 5, as shown in FIG. 6B, the fourth base 21 is left on the side of the peripheral edge 9 of the opening of the container.

The fourth base 21 may be provided with an opening having a polygonal shape, a star shape, or a circular shape, plural holes, or an opening 22 having a meshed shape. Accordingly, it is possible to control the flow of the contents poured out from the container 7 by using the opening 22.

For example, in the case where the contents are viscous materials such as mayonnaise, a peripheral edge 23 of the opening 22 is formed in an appropriate shape so as to pour out the contents from the container 7 in the state where the sectional shape thereof is formed in a particular shape such as a star shape.

According to the invention, since the seal film 6 is formed by punching the laminated structure 4, the semi-circular peripheral edge of the handle portion 5 is formed to have the same shape as that of the peripheral edge of the circular portion of the seal film 6 sealing the opening of the container. Accordingly, the peripheral edge of the handle portion 5 does not protrude outward from the circular portion of the seal film 6. In addition, since the maximum width of the handle portion 5 is formed to be equal to the diameter of the circular portion of the seal film 6, it is possible to ensure the large dimension of the handle portion 5.

As a known method of manufacturing the handle portion, there are a method (for example, see FIG. 3 in Patent Document 3) of bending one sheet of film in a mountain-folding shape and adhering the inside thereof through adhesive or the like as disclosed in Patent Documents 1 to 3 and a method of dividing the inner seal into two seal pieces, manufacturing the protruding handle portion in only a part of the left and right seal pieces, and heating the handle portion to be melt-fixed to each other in the state where the left and right handle portions overlap with each other as disclosed in the paragraph 30 in Patent Document 3 and FIG. 6.

However, in the method of interfolding the film in a mountain-folding shape, a difference in thickness of the respective portions of the base is large until the inside of the mountain-shaped portion is adhered, and the elongated film is not suitable for manufacturing the handle portion.

In addition, as disclosed in the paragraph 30 in Patent Document 3, in the method of overlapping the protruding handle portions previously formed in the left and right seal pieces to be melt-fixed to each other, a problem arises in that it is difficult to accurately perform the positioning operation of the small handle portion and the positional deviation occurs.

In this case, in order to prevent the handle portion from protruding due to the positional deviation, it is necessary to form the handle portion in a part of the circular seal portion.

On the contrary, according to the invention, since the handle portion 5 is formed by sealing two sheets of films and permanufacturing a punching process thereon, it is possible to prevent the handle portion 5 from protruding and to easily form the large handle portion 5 which can be easily gripped.

In addition, herein, although the punching process is performed on the center of the folding line 1c so that the folding line 1c is equal to the diameter of the circular portion of the seal film 6 upon permanufacturing the punching process, the punching process may be performed on a biased portion so that an area of the handle portion 5 is larger or smaller than a half of an area of the circular portion. Further, herein, the punching shape is circular, but may be other shapes, that is, a polygonal shape such as an oval shape, a square shape, or a hexagonal shape. Furthermore, the shape of the seal film 6 may be formed after permanufacturing the punching process on the laminated structure 4 and removing a part of the outer peripheral portion of the handle portion 5.

Next, in the invention, the seal film including three bases and the method of manufacturing the inner seal attachment container using the same will be described.

Figure 9:
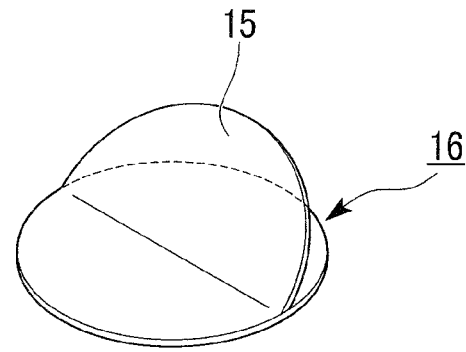
FIG. 9 is a perspective diagram showing a modified example of the seal film.
Figure 10:
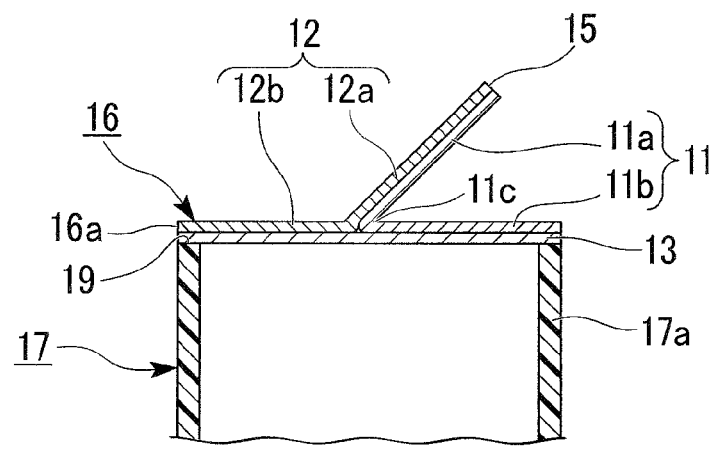
FIG. 10 is a sectional diagram showing an example of a shape in which the opening of the container is sealed by the seal film according to the modified example.
Figure 11:
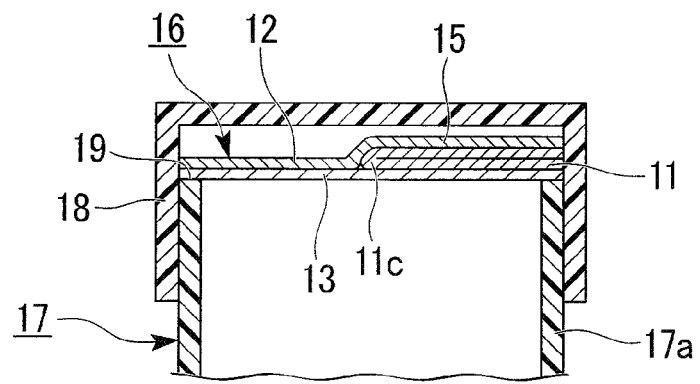
FIG. 11 is a sectional diagram showing an example of a shape in which the opening of the cap attachment container is sealed by the seal film according to the modified example.

FIGS. 7A to 7D are sectional process diagrams illustrating the method of manufacturing the seal film according to the third embodiment of the invention. FIGS. 8A to 8D are sectional process diagrams illustrating the method of manufacturing the seal film according to the fourth embodiment of the invention. FIG. 9 is a perspective view showing a modified example of the seal film. FIG. 10 is a sectional view showing an example of a shape in which the opening of the container is sealed by the seal film according to the modified example. FIG. 11 is a sectional view showing an example of a shape in which the opening of the cap attachment container is sealed by the seal film.

The seal film manufacturing method according to the embodiment is to form the seal film having the handle portion by the following steps (1) to (3).

Figure 7A:
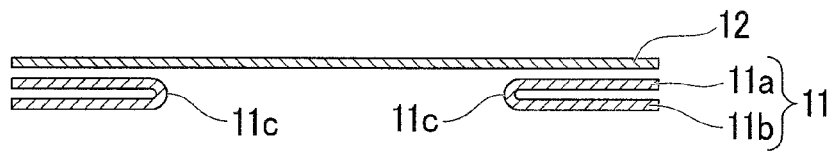
FIG. 7A is a sectional process diagram illustrating the method of manufacturing the seal film according to the third embodiment of the invention.
Figure 7B:
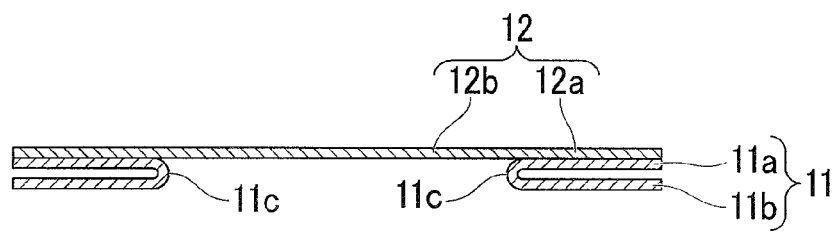
FIG. 7B is a sectional process diagram illustrating the method of manufacturing the seal film according to the third embodiment of the invention.
Figure 8A:
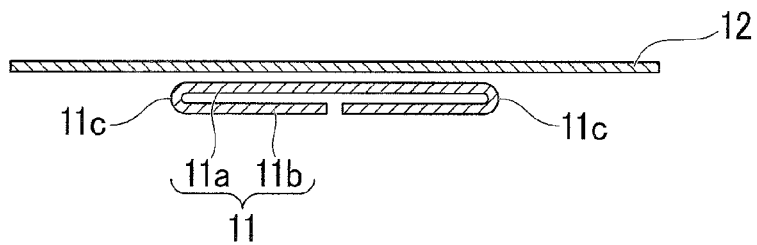
FIG. 8A is a sectional process diagram illustrating the method of manufacturing the seal film according to the fourth embodiment of the invention.
Figure 8B:
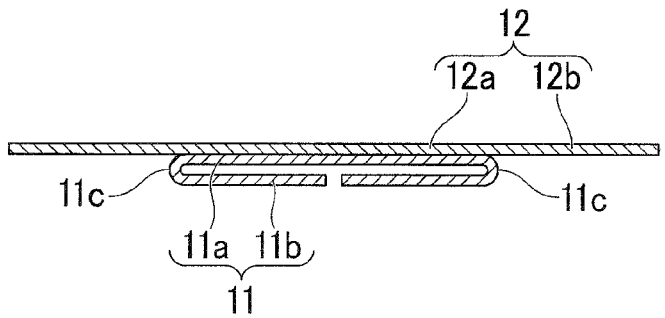
FIG. 8B is a sectional process diagram illustrating the method of manufacturing the seal film according to the fourth embodiment of the invention.

(1) As shown in FIGS. 7A and 8A, a first base 11 formed of an elongated film having a sealant layer formed on one surface thereof is interfolded along a folding line 11c extending in a flow direction thereof so that the opposite surfaces of the sealant layer face each other. As shown in FIGS. 7B and 8B, one portion 11a of two portions 11a and 11b divided by the folding line 11c of the first base 11 overlaps with a second base 12 formed of an elongated film having a sealant layer formed on one surface thereof so that the sealant layers of both bases 11 and 12 face each other. Then, one portion 11a of the first base 11 is sealed to the second base 12.

Figure 7C:
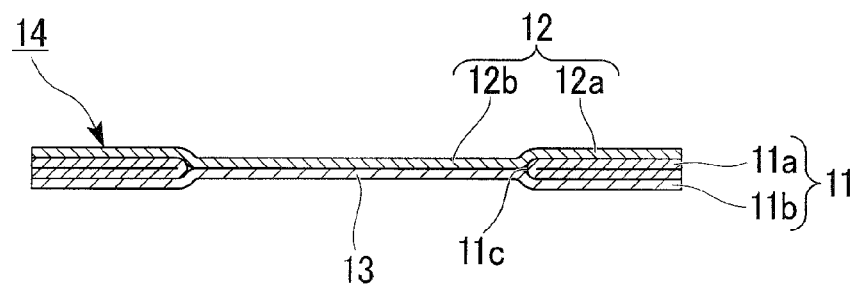
FIG. 7C is a sectional process diagram illustrating the method of manufacturing the seal film according to the third embodiment of the invention.
Figure 8C:
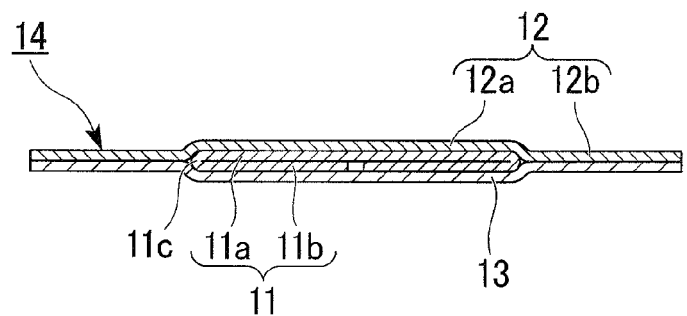
FIG. 8C is a sectional process diagram illustrating the method of manufacturing the seal film according to the fourth embodiment of the invention.

(2) As shown in FIGS. 7C and 8C, the portions 11b and 12b of the first and second bases 11 and 12 which are not sealed to each other are sealed to a third base 13 formed of an elongated film having a sealant layer formed on one surface thereof so that the other portion 11b different from the one portion 11a of the first base 11 is sealed to the third base 13, and the portion 12b of the second base 12 not sealed to the first base 11 is sealed to the third base 13 in the state where the sealant layers of the first and second bases 11 and 12 overlap with the sealant layer of the third base 13 to face each other. Accordingly, it is possible to obtain a laminated structure 14 formed by sealing the first to third bases.

Figure 7D:
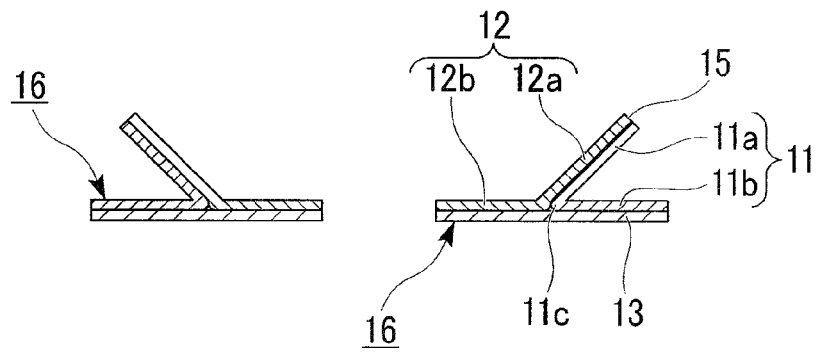
FIG. 7D is a sectional process diagram illustrating the method of manufacturing the seal film according to the third embodiment of the invention.
Figure 8D:
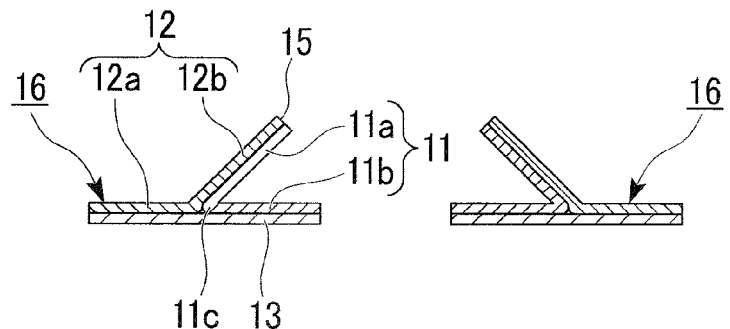
FIG. 8D is a sectional process diagram illustrating the method of manufacturing the seal film according to the fourth embodiment of the invention.

(3) As shown in FIGS. 7D and 8D, the laminated structure 14 is punched into a predetermined shape so that a portion of the folding line 11c is included in a punching area, thereby manufacturing the handle portion 5 including the portions 11a and 12a of the first and second bases 11 and 12 sealed to each other. Accordingly, as shown in FIG. 9, it is possible to obtain a seal film 16 having the handle portion 15.

In the embodiment, as shown in FIG. 7, two sheets of the first bases 11 may be provided so as to correspond to the side edges of the second base 12. In addition, as shown in FIG. 8, the folding lines 11c may be formed at two positions of the first base 11 so that the one portion 11a sealed to the second base 12 is formed in the both side edges of the first base 11.

According to these examples, since the folding lines 11c are formed at two positions of the laminated structure 14 of the respective bases, it is possible to form the seal film punched in two rows.

As shown in FIG. 10, it is possible to use the seal film 16 formed by the embodiment as a seal for closing the opening in such a manner that an outer peripheral edge 16a is sealed to a peripheral edge 19 of the opening of the container 17. In addition, it is possible to use the seal film 16 as an inner seal used inside a cap 18 in the case where the cap 18 is mounted to the cylindrical portion of the container 17.

In the seal film 16 according to the embodiment, it is desirable that the third base 13 be formed of an elongated film having sealant layers formed on both surfaces thereof and a metal layer formed therein. In this case, in the case of manufacturing the inner seal attachment container by using the seal film 16 according to the embodiment, as shown in FIG. 11, a method may be used which places the seal film 16 having the handle portion 15 on the peripheral edge 19 of the opening of the container; mounts the cap 18 to the opening of the container; and seals a gap between the third base 13 of the seal film 16 and the peripheral edge 19 of the opening of the container through the high-frequency induction heating process in the state where the third base 13 of the seal film 16 comes into press contact with the peripheral edge 19 of the opening of the container inside the cap 18.

Accordingly, since the seal film 16 is positioned to the peripheral edge 19 of the opening of the container by means of the inner surface of the cap 18, it is possible to easily perform the positioning operation of the seal film 16. In this case, in order to allow the high frequency to arrive at the metal layer inside the third base 13, at least the cylindrical portion 17a of the container 17 and the cap 18 are formed of an insulating material such as plastic.

As a method of placing the seal film 16 on the peripheral edge 19 of the opening of the container, desirably a method may be used which loads the seal film 16 having the handle portion 15 facing downward in the inside of the cap 18 in advance; mounts the cap 18 loaded with the seal film 16 to the opening of the container 17; and allows the surface of the third base 13 of the seal film 16 above the peripheral edge 19 of the opening of the container to come into contact with the peripheral edge 19 of the opening of the container.

According to this method, it is possible to easily perform the method using an automatic machine compared with a method which places the seal film 16 on the peripheral edge 19 of the opening of the container and mounts the cap 18 thereto.

In the case of the seal film 16 according to the embodiment, since the third base 13 is sealed to the first and second bases 11 and 12 before permanufacturing the punching process on the laminated structure 14, it is possible to prevent the deviation between the first and second bases 11 and 12 and the third base 13.

Further, in the case of manufacturing the inner seal attachment container using the seal film 16 according to the embodiment, instead of directly placing the seal film 16 on the peripheral edge 19 of the opening of the container, a fourth base having both sealable surfaces may be interposed between the seal film 16 and the peripheral edge 19 of the opening of the container and the seal film 16 may be placed thereon.

In this case, the seal film having the handle portion facing downward and the fourth base having both sealable surfaces are sequentially loaded in the inside the cap, the cap loaded with the seal film and the fourth base is mounted to the opening of the container, and then the high-frequency induction heating process is performed in the state where the seal film comes into press contact with the peripheral edge of the opening of the container inside the cap.

Accordingly, a gap (a gap between the lower surface of the third base of the seal film and the upper surface of the fourth base, and a gap between the lower surface of the fourth base and the peripheral edge of the opening of the container) from the seal film to the peripheral edge of the opening of the container is sealed mutually by heat generated by high frequency from the inside of the third base.

According to this method, it is possible to form the inner seal attachment container having the structure shown in FIGS. 6A and 6B except that the third base 13 is incorporated into the seal film 16 in advance.

Here, the fourth base is formed of a sealable member such as a thermoplastic resin. As described above, it is desirable that the seal strength between the fourth base and the peripheral edge of the opening of the container be strong.

Further, as described above, the fourth base may be provided with an opening having a polygonal shape, a star shape, or a circular shape, or an opening having plural holes or a meshed shape.

In the invention, a film having a sealant layer formed on one surface is used as the film used for the first to third bases. As the film, for example, a laminate film may be used in which a sealant layer formed of a resin having a heat sealing property is laminated on a surface of a base layer formed of a stretched film or the like. In addition, in order to easily seal the container, it is desirable that the third base have the sealant layers formed on both surfaces thereof.

In order to have a gas barrier property, a metal layer such as aluminum foil or a ceramic deposition film which is formed by depositing ceramic such as alumina ($Al_2O_3$) or silica (SiOx) on the film may be provided. In this case, it is desirable that the conservative property of the contents be improved by suppressing a gas such as oxygen or vapor from passing through the film.

As a resin manufacturing the sealant layer, a polyolefin-based resin such as polyethylene (PE), polypropylene (PP), or ethylene-acetic acid vinylic copolymer (EVA) may be used. Particularly, it is desirable that a material having an easy peeling property be used for the surface of the third base sealed to the container so as to be easily opened.

As a base layer, a single layer formed of a polyester-based resin such as polyethylene terephthalate (PET) or a polyamide-based resin such as nylon, or a multi layer formed by the combination thereof may be used.

As a method of sealing the base, heat sealing (thermal sealing), ultrasonic sealing, high-frequency sealing, or the like may be used. Among them, the heat sealing is desirable.

The materials of the first base and the second base may have the same thickness or different thicknesses. For example, in the laminated structure, in order to minimize a difference in thickness between the laminated portion of the first and second bases used as the handle portion and the portion except for the handle portion, the thickness of the first base may be smaller than that of the second base.

Further, according to the invention, since it is possible to form the seal film from the elongated film as an raw fabric, it is possible to adopt a technology used for a bag producing machine. For example, as shown in FIGS. 2 and 8, when two sheets of first bases 1 or 11 overlap with one sheet of the second base 2 or 12, a method may be used which uses one sheet of elongated film as the raw fabric of the first base 1 or 11, cuts the raw fabric into a half during the transport operation thereof to obtain two sheets of the first bases 1 or 11, and then separately folds the two sheets.

In addition, when the first base as the interfolding film is transported and overlaps with the second base, the transport direction of the base is biased by matching rolls provided with a servo motor so as to control the overlapping position of both bases. A method may be used which provides a pitch printing drawing pattern on several bases of the first and second bases and measures a position of the drawing pattern by using an optical sensor so as to detect a positional deviation. As the optical sensor, for example, a photoelectric cell, a CCD camera, or the like may be used. The pitch printing drawing pattern may be provided in a portion manufacturing the seal film or may be provided in a portion which is removed by the punching process.

In the case of using the seal films 6 and 16 according to the invention as the inner seal, as shown in FIGS. 5 and 11, the handle portions 5 and 15 lie down in the mounting state of the caps 8 and 18. However, as shown in FIGS. 4 and 10, when the caps 8 and 18 are separated, the handle portions 5 and 15 are adapted to naturally stand up by the elasticity thereof by adjusting the thickness or elasticity of the first bases 1 and 11 respectively manufacturing the rear surfaces of the handle portions 5 and 15 and the second bases 2 and 12 respectively manufacturing the front surfaces of the handle portions 5 and 15.

In addition, in the seal films 6 and 16 according to the invention, when the first bases 1 and 11 respectively manufacturing the rear surfaces of the handle portions 5 and 15 and the second bases 2 and 12 respectively manufacturing the front surfaces of the handle portions 5 and 15 are made to have different colors and shapes, a user is able to easily notice the existence of the handle portions 5 and 15 upon seeing the openings respectively sealed by the sealed by the seal films 6 and 16, and is able to easily notice that the openings are easily opened by gripping the handle portions 5 and 15.

Accordingly, in the state where the handle portions 5 and 15 are provided, it is possible to solve the difficulty caused when outer peripheral edges 6a and 16a of the seal films 6 and 16 are attempted to be peeled off as if the handle portions are not provided. In addition, a peeling direction marked as an arrow or the like may be provided on the upper surfaces (the opposite surfaces of the sealant layers) of the second bases 2 and 12 respectively manufacturing the front surfaces of the handle portions 5 and 15.

Next, the fifth embodiment of the invention will be described with reference to FIGS. 12A to 12D, and the sixth embodiment of the invention will be described with reference to FIGS. 13A to 13D.

Figure 12A:
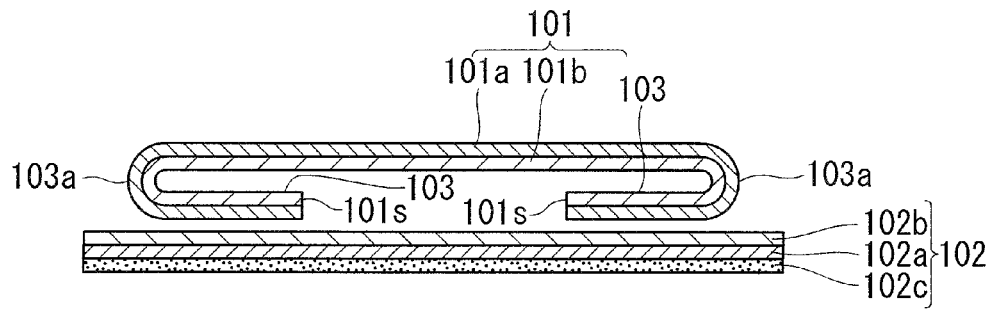
FIG. 12A is a sectional diagram illustrating a base overlapping process in the method of manufacturing the seal film according to the fifth embodiment of the invention.
Figure 12B:
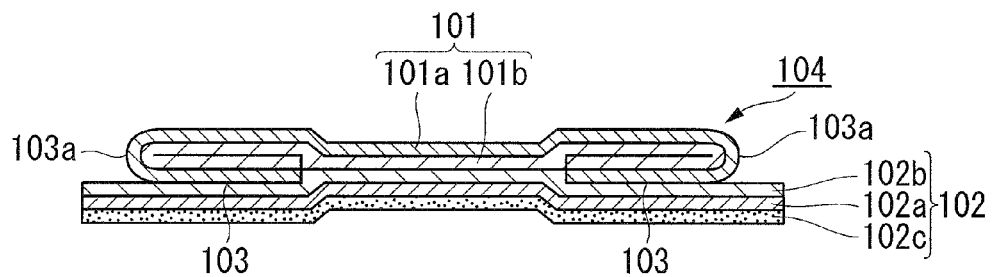
FIG. 12B is a sectional diagram showing a laminated structure obtained by the sealing of the bases in the method of manufacturing the seal film according to the fifth embodiment of the invention.
Figure 12C:
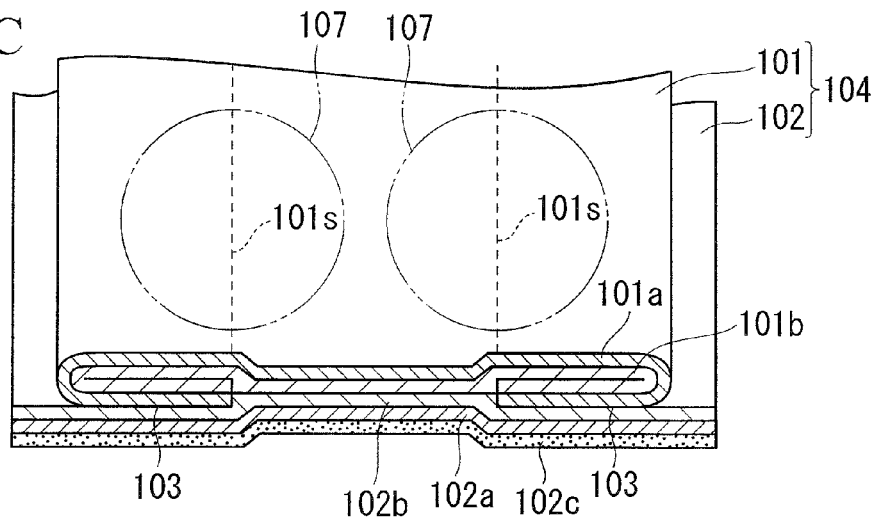
FIG. 12C is a partially perspective sectional diagram illustrating a punching process in the method of manufacturing the seal film according to the fifth embodiment of the invention.
Figure 12D:
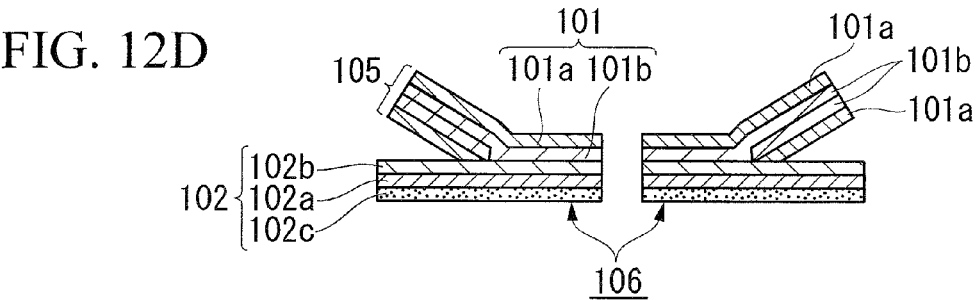
FIG. 12D is a sectional diagram showing the seal film obtained by punching in the method of manufacturing the seal film according to the fifth embodiment of the invention.

FIGS. 12A to 12D are diagrams showing the method of manufacturing the seal film according to the fifth embodiment of the invention. FIG. 12A is a sectional view illustrating a base overlapping process. FIG. 12B is a sectional view showing a laminated structure obtained by the sealing of the bases. FIG. 12C is a partially perspective sectional view illustrating a punching process. FIG. 12D is a sectional view showing the seal film obtained by punching.

Figure 13A:
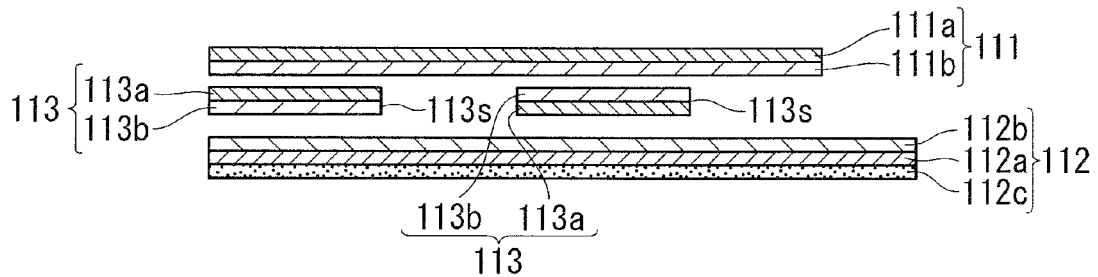
FIG. 13A is a sectional diagram illustrating the base overlapping process in the method of manufacturing the seal film according to the sixth embodiment of the invention.
Figure 13B:
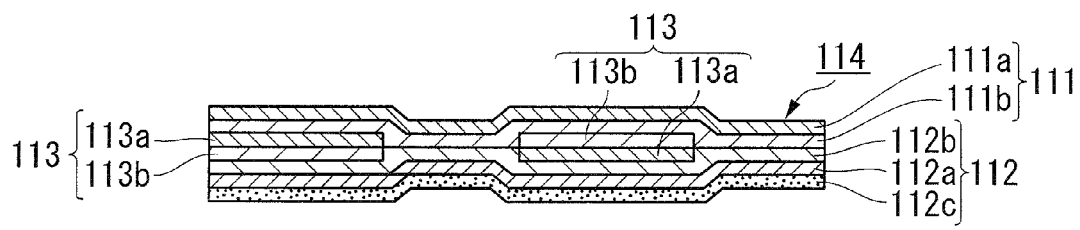
FIG. 13B is a sectional diagram showing the laminated structure obtained by the sealing of the respective bases in the method of manufacturing the seal film according to the sixth embodiment of the invention.
Figure 13C:
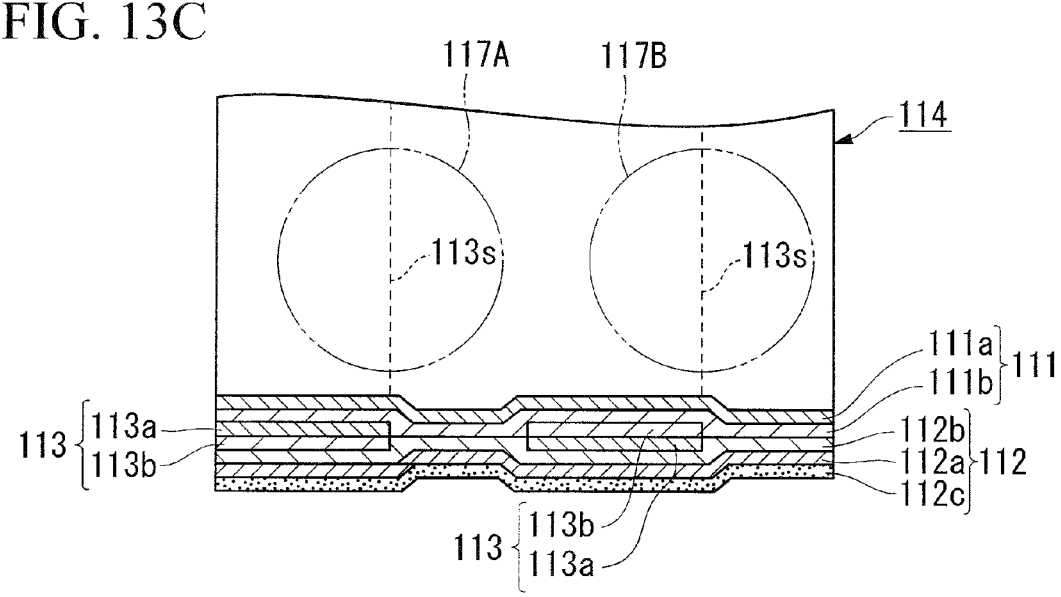
FIG. 13C is a partially perspective sectional diagram illustrating the punching process in the method of manufacturing the seal film according to the sixth embodiment of the invention.
Figure 13D:
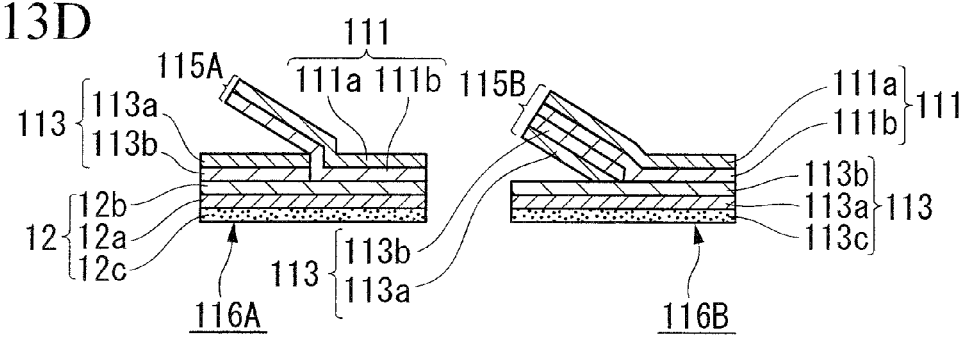
FIG. 13D is a sectional diagram showing the seal film obtained by punching in the method of manufacturing the seal film according to the sixth embodiment of the invention.

FIGS. 13A to 13D are diagrams showing the method of manufacturing the seal film according to the sixth embodiment of the invention. FIG. 13A is a sectional view illustrating a base overlapping process. FIG. 13B is a sectional view showing a laminated structure obtained by the sealing of the bases. FIG. 13C is a partially perspective sectional view illustrating a punching process. FIG. 13D is a sectional view showing the seal film obtained by punching.

First bases 101 and 111 are respectively formed of elongated films each having a sealant layer formed on one surface thereof, and respectively include two layers of at least base layers 101a and 111a and sealant layers 101b and 111b. The sealant layer may be formed by one or two types or more of a polyolefin-based resin such as polyethylene (PE), polypropylene (PP), or ethylene-acetic acid vinylic copolymer (EVA). In addition, as a base layer, the combination of a single layer or a multi layer formed of a polyester-based resin such as polyethylene terephthalate (PET) or a polyamide-based resin such as nylon (NY) may be used. Among them, a stretching film is desirable. The first base may further include one or two or more of a gas barrier layer, a printing layer, an adhesive layer, a function layer, and the like between the base layer and the sealant layer or on the surface of the base layer.

A third base 113 according to the sixth embodiment has the same configuration as that of the first base 111, and uses an elongated film having a width smaller than those of the first base 111 and the second base 112. In the invention, the meaning that the third base 113 has the same configuration as that of the first base 111 indicates that the types of the materials of the first base 111 are the same as those of the third base 113. That is, the layer materials, the layer thicknesses, or the combination thereof between the base layers 111a and 113a, the sealant layers 111b and 113b, or the like are the same as each other.

Second bases 102 and 112 are respectively formed of elongated films each having at least a sealant layer formed on one surface thereof. As this kind of film, in addition to a film (single-layer film) formed by a single sealant layer, a multi-layered film having a sealant layer formed on one surface or both surfaces may be used. The second base may include a base layer. As a base layer, the combination of a single layer or a multi layer formed of a polyester-based resin such as polyethylene terephthalate (PET) or a polyamide-based resin such as nylon (NY) may be used. Among them, a stretching film is desirable.

The second bases 102 and 112 may include a layer (high-frequency heating layer) which can be heated by high frequency, and as the high-frequency heating layer, metal foil such as aluminum foil may be used. Particularly, the lower surface (when the side sealed to the first base is set to the upper surface, the opposite surface thereof) of the second base is a surface sealed to the container, and it is desirable that a material having an easy peeling property be used for the surface so as to be easily opened. The second base may further include one or two or more of a gas barrier layer, a printing layer, an adhesive layer, a function granting layer, and the like.

FIGS. 12A to 13D shows the configuration of a sealant layer, a base layer, and an easy peel layer, where sealant layers 102b and 112b are respectively provided in the surfaces in which the second bases 102 and 112 are respectively sealed to the first bases 101 and 111, easy peel layers 102c and 112c are respectively provided in the surfaces sealed to the container, and base layers 102a and 112a are respectively provided therebetween. In addition, as configuration examples of other multi-layered films, there are various configurations such as a configuration of a sealant layer and a high-frequency heating layer, a configuration of a sealant layer and a base layer, and a configuration of a sealant layer, a high-frequency heating layer, and an easy peel layer.

As the above-described gas barrier layer, a ceramic deposition film formed by depositing ceramic such as alumina ($Al_2O_3$) or silica (SiOx), a metal layer such as aluminum, or a gas barrier resin layer such as ethylene-vinyl alcohol copolymer (EVOH) or vinylidene chloride may be used.

When the gas barrier layer is provided, it is desirable that the conservative property of the contents be improved by suppressing a gas such as oxygen or vapor from passing through the film.

Hereinafter, the method of manufacturing the seal film according to the fifth embodiment of the invention will be described with reference to FIGS. 12A to 12D.

In the method of manufacturing the seal film according to the embodiment, first, the first base 101 formed of an elongated film having the sealant layer 101b formed on one surface thereof and the second base 102 formed of an elongated film having the sealant layer 102b formed on at least one surface thereof are prepared. Both the first base 101 and the second base 102 are prepared in a roll shape, and are desirably used by sequentially sending out the bases.

Next, as shown in the sectional view in FIG. 12A, a part of the end portion of the first base 101 is interfolded along a folding line 103a extending in a flow direction thereof so that the surfaces of the sealant layer 101b face each other, and then the first base 101 and the second base 102 are sealed to each other in the state where a side having a folding back portion 3 of the first base 101 overlaps with the sealant layer 102b of the second base 102 so as to face each other.

The operation of interfolding the end portion of the first base 101 can be performed by using, for example, an interfolding plate.

In the case where the one-side end portion is folded back during the folding back operation, one chamfered portion of the seal film is possible. In addition, as shown in FIG. 12A, in the case where both end portions of the first base 101 are folded back, two chamfered portions of the seal film are possible.

In addition, as a method of sealing the base after the folding process, heat sealing (thermal sealing), ultrasonic sealing, high-frequency sealing, or the like may be used. Among them, the heat sealing is desirable.

In addition, when a heat sealing operation is performed by using a hot plate in the sealing process, in order to prevent the outward protruding sealant layers of the first and second bases 101 and 102 from being melt-fixed to the hot plate or the like, it is desirable that a film (a polyethylene terephthalate (PET) film, a nylon film, a film or sheet treated by fluorine or silicon, or the like) which is not melt-fixed to the sealant layer be interposed.

When an elongated film which is the same as the first base 101 and the second base 102 is used as the film which is not melt-fixed to the sealant layer, it is possible to transport the film together with the bases 101 and 102 in an overlapping state before sealing means.

As shown in the sectional view in FIG. 12B, it is possible to obtain a laminated structure 104 by the sealing of the first and second bases 101 and 102.

Next, as shown in FIG. 12C, at the time when the laminated structure 104 of the first and second bases 101 and 102 formed by the sealing process is punched into a predetermined shape, the punching process is performed so that the folding back portion 103 of the first base 101 is included in a punching area 107, thereby manufacturing a handle portion 105 formed by the sealed portions of the first base 101. Accordingly, as shown in FIG. 12D, it is possible to obtain a seal film 106 having the handle portion 105.

In the case where the opening sealed by the seal film is provided in a cylindrical portion formed to have the opening in the front end thereof, it is desirable that the shape punching the seal film be formed to have a diameter substantially equal to an outer diameter of the cylindrical portion so that the outward protruding amount thereof is as small as possible. In addition, in the case where the opening sealed by the seal film is opened in a flat wall surface, it is desirable that the punching shape be formed to have a size in which a sealing width is ensured on the outside of the opening.

In addition, herein, although the punching process is performed on the center of an end portion 101s so that the end portion 101s of the first base 101 is equal to the diameter of the cylindrical portion of the seal film 6 upon permanufacturing the punching process, the punching process may be performed on a biased portion so that an area of the handle portion 105 is larger or smaller than a half of an area of the circular portion. Further, herein, the punching shape of the laminated structure is circular, but may be other shapes, that is, a polygonal shape such as an oval shape, a square shape, or a hexagonal shape. Furthermore, the shape of the seal film 106 may be formed by permanufacturing the punching process on the laminated structure 104 and removing a part of the outer peripheral portion of the handle portion 105.

Hereinafter, the method of manufacturing the seal film according to the sixth embodiment of the invention will be described with reference to FIGS. 13A to 13D.

In the above-described fifth embodiment, the handle portion 105 is formed by the folding back portion 103 of the first base 101. However, in the sixth embodiment of the invention, a third base 113 having the same configuration as that of the first base 111 is prepared, and a handle portion 115A formed by the first base 111 on the side of the third base 113 or a handle portion 115B formed by the sealed portions of the first base 111 and the third base 113 is formed, thereby manufacturing seal films 116A and 116B having the same function as that of the seal film 106 according to the fifth embodiment.

In the method of manufacturing the seal film according to the embodiment, first, the first base 111 formed of an elongated film having the sealant layer 111b formed on one surface thereof, the second base 112 formed of an elongated film having the sealant layer 112b formed on at least one surface thereof, and the third base 113 formed of an elongated film having the same configuration as that of the first base 111 and having a width smaller than those of the first and second bases 111 and 112 are prepared. The first and second bases 111 and 112 are prepared in a roll shape, and are desirably used by sequentially sending out the bases.

Regarding the third base 113, a required number of rolls may be prepared in accordance with the number of chamfered portions, and the rolls may be set on a mill roll stand so that the third base 113 is inserted between the first base 111 and the second base 112. Alternatively, the third base 113 may be prepared by slitting the first base 111 sent out from the mill roll stand online (a part of the elongated film is cut along a flow direction to obtain two or more elongated films).

Next, as shown in FIG. 13A, the sealant layer 111b of the first base 111 is allowed to face the sealant layer 112b of the second base 112, the third base 113 is inserted between the first and second bases 111 and 112, and then an area having the overlapping portion of the first to third bases 111, 112, and 113 and the overlapping portion of the first and second bases 111 and 112 is sealed. The number of the inserted third bases 113 is not particularly limited. When the number of inserted third bases 113 is one, one chamfered portion is possible, and when the number of inserted third bases 113 is two as shown in FIG. 13B, two chamfered portions are possible. Further, when the number of inserted third bases 113 is three or more, three or more chamfered portions are possible.

As a method of sealing the base, heat sealing (thermal sealing), ultrasonic sealing, high-frequency sealing, or the like may be used. Among them, the heat sealing is desirable.

In addition, when a heat sealing operation is performed by using a hot plate in the sealing process, in order to prevent the outward protruding sealant layers of the overlapping bases from being melt-fixed to the hot plate or the like, it is desirable that a film (a polyethylene terephthalate (PET) film, a nylon film, a film or sheet treated by fluorine or silicon, or the like) which is not melt-fixed to the sealant layer be interposed. When an elongated film which is the same as the bases 111 to 113 is used as the film which is not melt-fixed to the sealant layer, it is possible to transport the film together with the bases 111 to 113 in an overlapping state before sealing means.

As shown in the sectional view in FIG. 13B, it is possible to obtain a laminated structure 114 by the sealing of the first to third bases 111 to 113.

Next, as shown in FIG. 13C, when the laminated structure 114 formed by the sealing process is punched into a predetermined shape, the punching process is performed so that an end portion 113s on the side of one surface of the third base 113 is included in punching areas 117A and 117B, thereby manufacturing the handle portion 115A formed by the first base 111 on the side of the third base 113 or the handle portion 115B formed by the sealed portions of the first and third bases 111 and 113. Accordingly, as shown in FIG. 13D, it is possible to obtain the seal films 116A and 116B respectively having the handle portions 115A and 115B.

In the embodiment, at the time when the third base 113 is inserted between the first and second bases 111 and 112, when the sealant layer 113b of the third base 113 overlaps with the sealant layer 112b of the second base 112 so as to face each other as shown in left of FIG. 13A, it is possible to obtain the seal film 116A having the handle portion 115A formed by the first base 111 on the side of the third base 113. When the sealant layer 113b of the third base 113 overlaps with the sealant layer 111b of the first base 111 so as to face each other as shown in right of FIG. 13A, it is possible to obtain the seal film 116B having the handle portion 115B formed by the sealed portions of the first and third bases 111 and 113.

FIGS. 13A to 13D shows the example in which two types of seal films 116A and 116B are formed together, but the invention is not particularly limited thereto.

The direction of inserting the third base 113 (the up and down of the sealant layer 113b) may be arbitrary set, and the insertion direction may be selected in accordance with the usage purpose. Even in the case where the third base 113 is prepared by slitting the first base 111 online, the vertical direction of the sealant layer 113b of the third base 113 is halfway inverted where necessary so as to form any one of two types of seal films 116A and 116B.

At the time when two or more chamfered portions are formed, the sealant layer 113b of all the third base 113 overlaps with the sealant layer 112b of the second base 112 so as to face each other, thereby manufacturing only the seal film 116A having the handle portion 115A may formed by the first base 111 on the side of the third base 113.

In addition, the sealant layer 113b of all the third base 113 overlaps with the sealant layer 111b of the first base 111 so as to face each other, thereby manufacturing only the seal film 116B having the handle portion 115B may formed by the sealed portion of the first and third bases 111 and 113.

Since the shape or dimension of the punching of the laminated structure 114, the shape of the handle portions 115A and 115B subjected to the punching process, and the like can be formed at the same time when the seal film 106 is formed by punching the laminated structure 104 according to the fifth embodiment, the repetitive description thereof will be omitted.

(Seal Film)

The seal films 106, 116A, and 116B formed by the embodiment is used as a seal for closing the opening by sealing the outer peripheral edge thereof to the peripheral edge of the opening of the container. In addition, in the case where the cap is mounted to the cylindrical portion of the container, the seal films may be used as an inner seal used inside the cap.

In the case of opening the container, it is possible to easily open the container by gripping the handle portions 105, 115A, and 115B of the seal films 106, 116A, and 116B using a finger or the like so as to be peeled therefrom.

In the case of the seal films 106, 116A, and 116B formed by the invention, since the handle portions 105, 115A, and 115B are formed so as to protrude upward from the opening of the container, it is easy to grip the handle portions 105, 115A, and 115B.

In addition, at the time when the inner seal attachment container is formed by using the seal film according to the embodiment, in the case of using the seal films 106, 116A, and 116B having the high-frequency heating layer formed in the second base 102 and 112, a method may be used which disposes the seal film having the handle portion on the peripheral edge of the opening of the container so that the second bases 102 and 112 face downward; mounts the cap to the opening of the container; and then seals a gap between the seal film and the peripheral edge of the opening of the container through the high-frequency induction heating process in the state where the seal film comes into press contact with the peripheral edge of the opening of the container in the inside of the cap.

Accordingly, since the seal film is positioned to the peripheral edge of the opening of the container by means of the inner surface of the cap, it is possible to easily perform the positioning operation of the seal film. In this case, in order to allow the high frequency to arrive at the high-frequency heating layer inside the second base, at least the cylindrical portion and the cap of the container are formed of an insulating material such as plastic.

In addition, in the case of using the seal films 106, 116A, and 116B not having the high-frequency heating layer formed in the second bases 102 and 112, a method may be used which places a fourth base having the same shape as the punching shapes of the seal films 106, 116A, and 116B and having sealant layers formed on both surfaces thereof and a high-frequency heating layer formed therein on the peripheral edge of the opening of the container; disposes the seal film having the handle portion on the fourth base so that the second bases 102 and 112 face downward; mounts the cap to the opening of the container; and then seals a gap between the seal film and the fourth base and a gap between the fourth base and the peripheral edge of the opening of the container through the high-frequency induction heating process in the state where the seal film and the fourth base come into press contact with the peripheral edge of the opening of the container in the inside the cap.

Accordingly, since the seal film is positioned to the peripheral edge of the opening of the container by means of the inner surface of the cap, it is possible to easily perform the positioning operation of the seal film. In this case, in order to allow the high frequency to arrive at the high-frequency heating layer inside the fourth base, at least the cylindrical portion and the cap of the container are formed of an insulating material such as plastic.

As a method of placing the seal film on the peripheral edge of the opening of the container, desirably, a method may be used which loads the seal film having the handle portion facing downward in the inside of the cap in advance, and mounts the cap loaded with the seal film to the opening of the container.

In addition, as a method of placing the fourth base and the seal film on the peripheral edge of the opening of the container, desirably, a method may be used which sequentially loads the seal film having the handle portion facing downward and the fourth base in the inside of the cap in advance, and mounts the cap loaded with the seal film and the fourth base to the opening of the container.

Likewise, according to the method of loading an object, which is to be placed on the peripheral edge of the opening of the container, in the inside of the cap in advance and mounting the cap to the opening of the container, it is possible to easily perform the method using an automatic machine compared with the method which places the seal film or the fourth base and the seal film on the peripheral edge of the opening of the container and mounts the empty cap thereto.

In addition, at the time when the inner seal attachment container is formed by using the seal films 106, 116A, and 116B according to the embodiment, in the case of using the seal film having the high-frequency heating layer formed in the second bases 102 and 112, a fifth base having both sealable surfaces may be interposed between the second base and the peripheral edge of the opening of the container, and the seal film may be placed thereon. In this case, the seal film having the handle portion facing downward and the fifth base having both sealable surfaces are sequentially loaded in the inside of the cap, the cap loaded with the seal film and the fifth base is mounted to the opening of the container, and then the high-frequency induction heating process is performed in the state where the seal film comes into press contact with the peripheral edge of the opening of the container in the inside of the cap.

Accordingly, a gap (a gap between the lower surface of the seal film and the upper surface of the fifth base, and a gap between the lower surface of the fifth base and the peripheral edge of the opening of the container) from the seal film to the peripheral edge of the opening of the container is sealed by heat generated by high frequency from the inside of the second base.

Further, in the case of using the seal film not having the high-frequency heating layer formed in the second bases 102 and 112, the fifth base having both sealable surfaces may be interposed between the fourth base and the peripheral edge of the opening, and the fourth base and the seal film may be placed thereon.

In this case, the seal film having the handle portion facing downward, the fourth base having the sealant layer formed in the same shape as the punching shape of the seal film and having the high-frequency heating layer formed therein, and the fifth base having both sealable surfaces are sequentially loaded in the inside of the cap, the cap in which the fourth base and the fifth base are loaded on the seal film is mounted to the opening of the container, and then the high-frequency induction heating process is performed in the state where the seal film comes into press contact with the peripheral edge of the opening of the container in the inside the cap.

Accordingly, a gap (a gap between the lower surface of the seal film and the upper surface of the fourth base, a gap between the lower surface of the fourth base and the upper surface of the fifth base, and a gap between the lower surface of the fifth base and the peripheral edge of the opening of the container) from the seal film to the peripheral edge of the opening of the container is sealed mutually by heat generated by high frequency from the inside of the fourth base.

The fifth base is formed of a sealable member such as a thermoplastic resin, but particularly, it is desirable that seal strength between the fifth base and the peripheral edge of the opening of the container be strong. Accordingly, after separating the seal film by gripping the handle portion, the fifth base is left on the side of the peripheral edge of the opening of the container.

The fifth base may be provided with an opening having a polygonal shape, a star shape, or a circular shape, plural holes, or an opening having a meshed shape. Accordingly, it is possible to control the flow of the contents poured out from the container by using the opening.

For example, in the case where the contents are viscous materials such as mayonnaise, a peripheral edge of the opening is formed in an appropriate shape so as to pour out the contents from the container in the state where the sectional shape thereof is formed in a particular shape such as a star shape.

As described above, in the method of manufacturing the seal film according to the embodiment, it is possible to form the seal film by using two types of bases. In addition, since the sealant layers are formed of the same resin, it is possible to easily set the sealing condition and to obtain the reliable quality.

Next, the seventh embodiment of the invention will be described with reference to FIGS. 14A to 23B, and the eighth embodiment will be described with reference to FIGS. 24A to 25F.

Figure 15A:
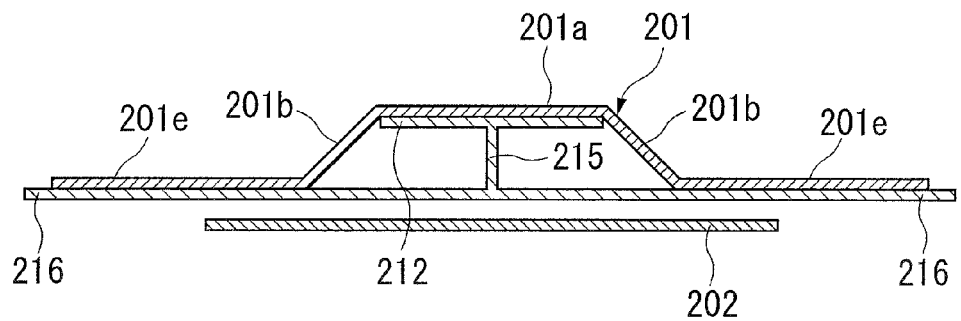
FIG. 15A is a sectional diagram taken along the line A-A in FIG. 14B.
Figure 15B:
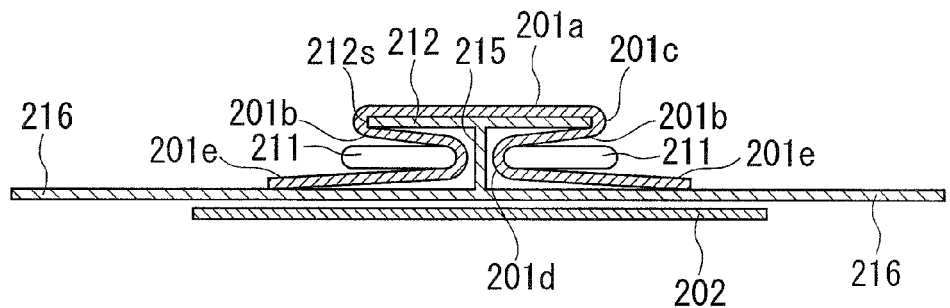
FIG. 15B is a sectional diagram taken along the line B-B in FIG. 14B.
Figure 15C:
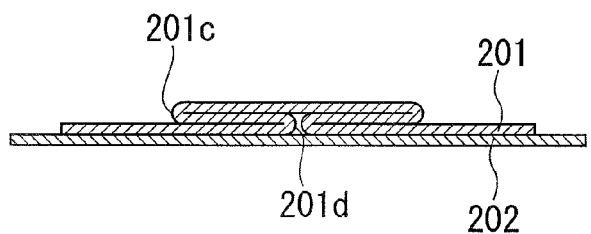
FIG. 15C is a sectional diagram taken along the line C-C in FIG. 14B.
Figure 16A:
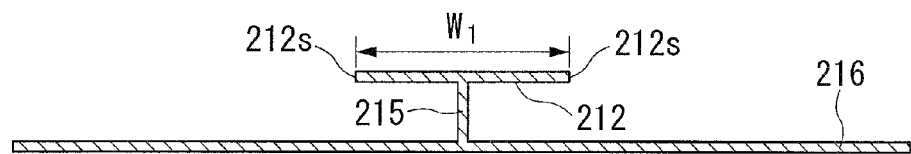
FIG. 16A is a sectional diagram showing an example of an interfolding assisting plate having a small width.
Figure 16B:
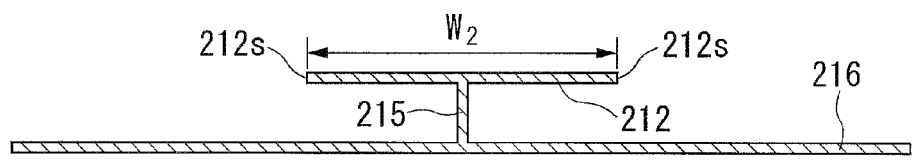
FIG. 16B is a sectional diagram showing an example of an interfolding assisting plate having a large width.
Figure 17A:
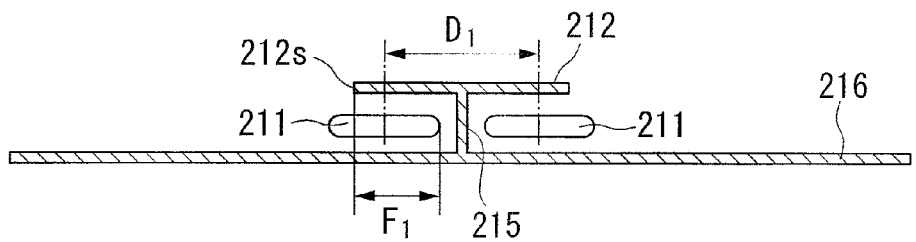
FIG. 17A is a sectional diagram showing an example of a state in which a distance between the centers of folding plates is small.
Figure 17B:
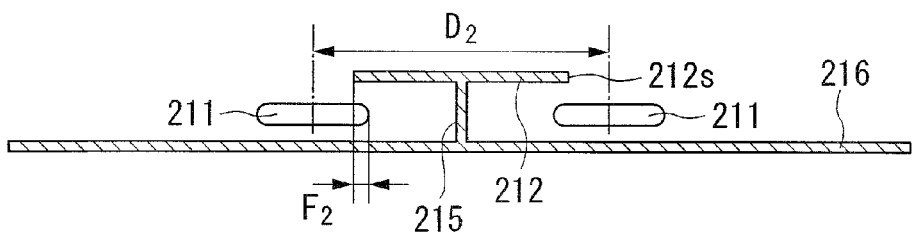
FIG. 17B is a sectional diagram showing an example of a state in which a distance between the centers of the folding plates is large.

FIGS. 14A and 14B are diagrams showing a device manufacturing the seal film according to the seventh embodiment of the invention. FIG. 14A is a plan view and FIG. 14B is a front view. FIGS. 15A, 15B, and 15C are sectional views respectively taken along the line A-A, the line B-B, and the line C-C in FIG. 14B. FIGS. 16A and 16B are sectional views showing an example in which a width of an interfolding assisting plate is changed. FIGS. 17A and 17B are sectional views showing an example in which a distance between the centers of the folding plates is changed.

FIGS. 18A, 19A, 20A, and 21A are partially plan views illustrating an example of the punching position of the seal film. FIGS. 18B, 19B, 20B, and 21B are sectional views showing the punched seal film.

Figure 22A:
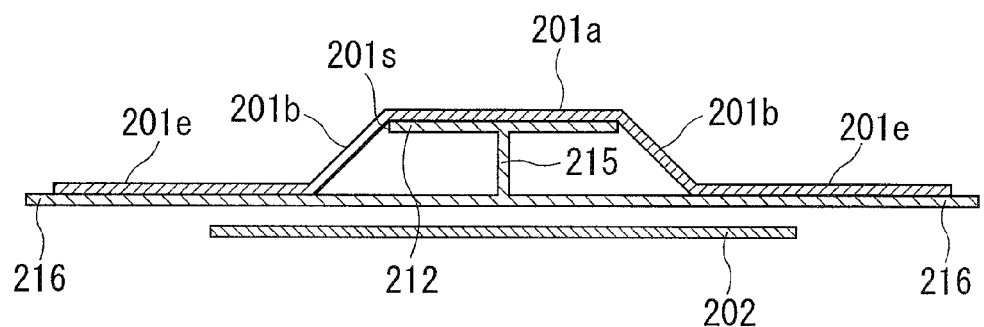
FIG. 22A is a sectional diagram showing an example of a state before folding the base in the case where only one sheet of folding plate is used.
Figure 22B:
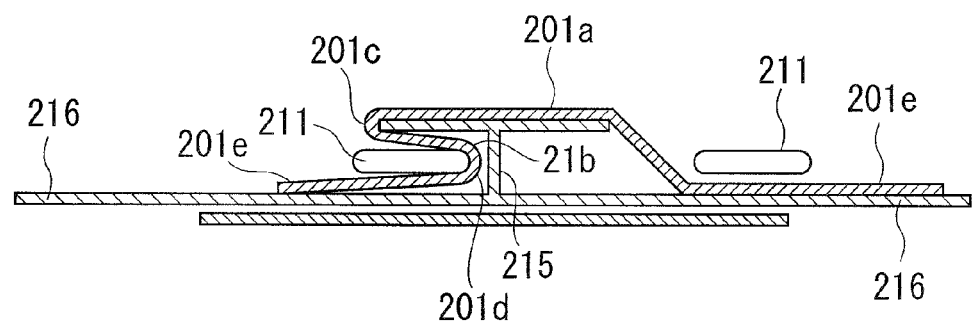
FIG. 22B is a sectional diagram showing an example of a state upon folding the base in the case where only one sheet of folding plate is used.
Figure 22C:
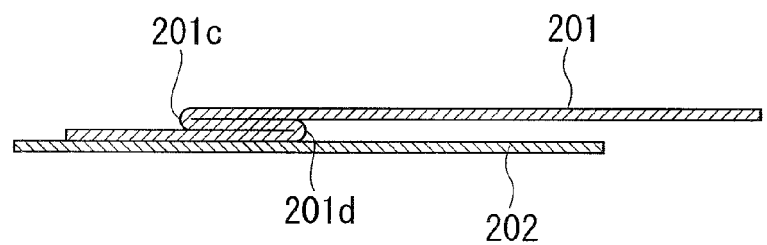
FIG. 22C is a sectional diagram showing an example of a state after folding the base in the case where only one sheet of folding plate is used.

FIGS. 22A, 22B, and 22C are sectional views showing examples before folding the base, upon folding the base, and after folding the base in the case where only one sheet of folding plate is used.

Figure 23A:
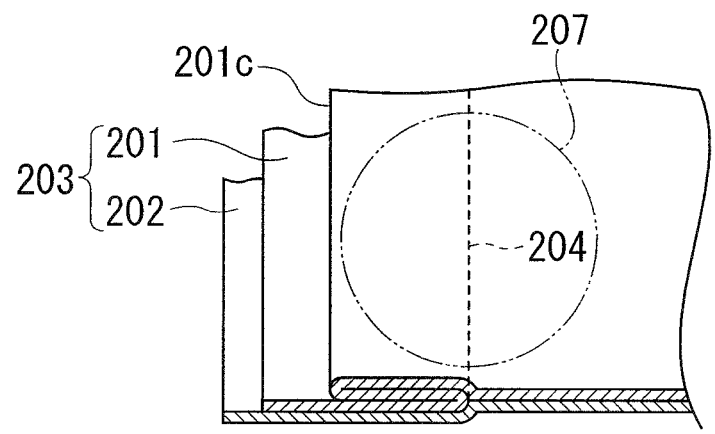
FIG. 23A is a partially plan diagram illustrating an example of the punching position upon manufacturing the seal film by means of the method in FIGS. 22A to 22C.
Figure 23B:
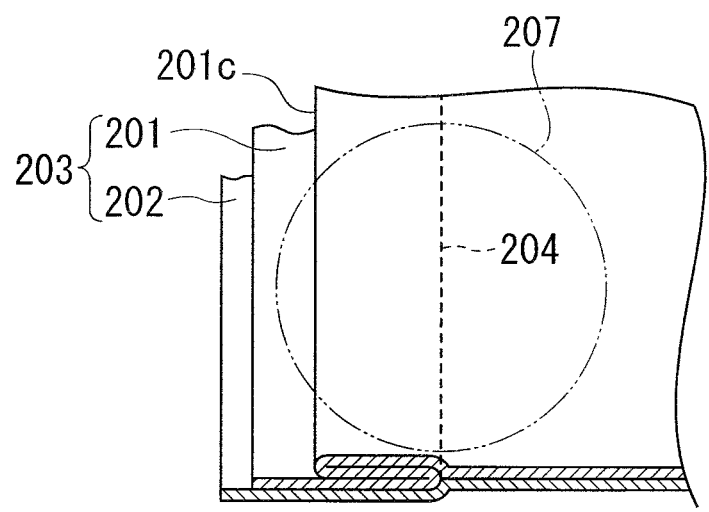
FIG. 23B is a partially plan diagram illustrating an example of the punching position upon manufacturing the seal film by means of the method in FIGS. 22A to 22C.

FIGS. 23A and 23B are partial plan views illustrating an example of the punching position upon manufacturing the seal film by the method in FIGS. 22A to 22C.

In addition, in FIGS. 18B, 19B, 20B, and 21B, for the detailed description, an easy peel layer 202e and sealant layers 201s and 202s of the bases 201 and 202 are particularly shown.

A first base 201 is formed of an elongated film having a sealant layer formed on one surface thereof, and includes two layers of at least a base layers 201f and a sealant layer 201s. The sealant layer may be formed by one or two types or more of a polyolefin-based resin such as polyethylene (PE), polypropylene (PP), or ethylene-acetic acid vinylic copolymer (EVA).

In addition, as a base layer, the combination of a single layer or a multi layer formed of a polyester-based resin such as polyethylene terephthalate (PET) or a polyamide-based resin such as nylon (NY) may be used. Among them, a stretching film is desirable.

The first base may further include one or two or more of a gas barrier layer, a printing layer, an adhesive layer, a function layer, and the like between the base layer and the sealant layer or on the surface of the base layer.

A second base is formed of an elongated film having at least a sealant layer formed on one surface thereof. As this kind of film, in addition to a film (single-layer film) formed by a single sealant layer, a multi-layered film having a sealant layer formed on one surface or both surfaces may be used.

The second base may include a base layer. As a base layer, the combination of a single layer or a multi layer formed of a polyester-based resin such as polyethylene terephthalate (PET) or a polyamide-based resin such as nylon (NY) may be used. Among them, a stretching film is desirable.

The second base may include a layer (high-frequency heating layer) which can be heated by high frequency, and as the high-frequency heating layer, metal foil such as aluminum foil may be used. Particularly, the lower surface (when the side sealed to the first base is the upper surface, the opposite surface thereof) of the second base is a surface sealed to the container, and it is desirable that a material having an easy peeling property be used for the surface so as to be easily opened.

The second base may further include one or two or more of a barrier layer, a printing layer, an adhesive layer, a function layer, and the like.

FIGS. 18B, 19B, 20B, and 21B show the configuration of the sealant layer, the base layer, and the easy peel layer, where the sealant layer 202s is provided in a surface sealed to the first base 201, the easy peel layer 202e is provided in a surface sealed to the container, and the base layer 202f is provided therebetween.

In addition, as configuration examples of other multi-layered films, there are various configurations such as a configuration of a sealant layer and a high-frequency heating layer, a configuration of a sealant layer and a base layer, and a configuration of a sealant layer, a high-frequency heating layer, and an easy peel layer.

As the above-described gas barrier layer, a ceramic deposition film formed by depositing ceramic such as alumina ($Al_2O_3$) or silica (SiOx), a metal layer such as aluminum, or a gas barrier resin layer such as ethylene-vinyl alcohol copolymer (EVOH) or vinylidene chloride may be used.

When the gas barrier layer is provided, it is desirable that the conservative property of the contents be improved by suppressing a gas such as oxygen or vapor from passing through the film.

In a seal film manufacturing device 210 according to the embodiment, the first base 201 is supplied from first base supply means 221, and is sent out to be transported by first base transport means 223.

In addition, the second base 202 is supplied from second base supply means 222, and is sent out to be transported by second base transport means 224.

As shown in FIG. 14B, an interfolding plate 211 and an interfolding assisting plate 212 as means for interfolding the first base 201 are provided between the first and second bases 201 and 202.

(Interfolding Process)

As shown in FIGS. 14A to 15C, in the method of manufacturing the seal film according to the embodiment, in the state where the first base 201 formed of an elongated film having a sealant layer formed on one surface thereof follows the interfolding assisting plate 212, the interfolding plate 211 comes into contact with both sides of the first base 201 at a position deviated from the interfolding assisting plate 212 so that the first base 201 is interfolded so as to have a Ω-shaped interfolding shape in a sectional view in a flow direction.

Further, in the invention, as shown in FIGS. 22A to 22C, the interfolding plate 211 comes into contact with one side of the first base 201 so that the first base 201 is interfolded so as to have an S-shaped or Z-shaped interfolding shape in a sectional view in a flow direction.

In the interfolding process, as shown in FIGS. 15A to 15C and 22A to 22C, in the state where the interfolding assisting plate 212 supports the first base 201 and the first base 1 follows the interfolding assisting plate 212, the interfolding plate 211 is used to come into contact with the first base 201 at a position deviated from the interfolding assisting plate 212 so that the first base 201 is interfolded so as to have an S-shaped, Z-shaped, or Ω-shaped interfolding shape in a sectional view in a flow direction.

Since the interfolding assisting plate 212 horizontally supports the first base 201, it is desirable that the interfolding assisting plate be horizontally provided. At this time, it is desirable that the interfolding plate 211 be horizontally provided.

The interfolding plate 211 is a plate-like member which is disposed so as to be substantially parallel to a portion 201a supported to the interfolding assisting plate 212 of the first base 201, and comes into contact with a portion 201b of the first base 201 descending from the interfolding assisting plate 212 so that the first base 201 is interfolded inward in the width direction of the portion 201a supported to the interfolding assisting plate 212.

Accordingly, when the first base 201 is interfolded from the left side, the S-shaped interfolding shape (see FIGS. 22A to 22C) is formed. When the first base is interfolded from the right side, the Z-shaped interfolding shape (not shown) is formed. When the first base is interfolded from both left and right sides, the Ω-shaped interfolding shape (see FIGS. 15A to 15C) is formed.

When two sheets of interfolding plates 211 and 211 move away from each other, as shown in FIGS. 18A, 18B, 19A, and 19B, two chamfered portions of a seal film 206 having one sheet of handle portion 205 are possible. In addition, when two sheets of interfolding plates 211 and 211 move close to each other, as shown in FIGS. 20A to 21B, it is possible to form a seal film 206 having two sheets of handle portions 205. As shown in FIGS. 22A to 22C, when only one sheet of interfolding plate 211 is used, as shown in FIGS. 23A and 23B, one chamfered portion of the seal film 206 having one sheet of handle portion 205 is possible.

When the interfolding plate 211 is disposed at an interfolding position of the first base 201 before starting the operation, it is possible to continuously perform the interfolding process in such a manner that the interfolding plate 211 narrows the first base 201 sequentially transported.

For this reason, it is possible to perform the interfolding process without requiring particular power. The interfolding plate 211 is provided so as to be movable in the width direction of the base.

Accordingly, before starting an operation, first, the interfolding plate 211 is disposed on the outside in the width direction of the interfolding assisting plate 212, the first base 1 passes over the interfolding assisting plate 212, and then the interfolding plate 211 moves to a position overlapping with the lower side of the interfolding assisting plate 212, thereby easily setting the first base 201.

In addition, at this time, as shown in FIGS. 17A and 17B, when a distance between $D_1$ and $D_2$ of the centers of the interfolding plates 211 and 211 is changed so that a vertical overlapping width $F_1$ and $F_2$ of between the interfolding plate 211 and the interfolding assisting plate 212 is adjusted, it is possible to arbitrarily set the overlapping width of the interfolded portion.

As described below, since the handle portion is formed by the interfolded portion, the overlapping width is adjusted in accordance with the length of the handle portion.

In addition, as shown in FIGS. 22A to 22C, in the case of using only one interfolding plate 211, the interfolding plate 211 which is not used may not move, and the vertical overlapping width $F_1$ and $F_2$ of between the interfolding plate 211 which is used and the interfolding assisting plate 212 may be adjusted.

It is desirable that the surface of the interfolding plate 211 be formed to have low friction force relative to the first base 201. For example, the surface may be formed of a material (silicon or fluorine resin) having low friction relative to the base, or may be coated with a material (silicon coating or fluorine resin coating) having low friction. When the interfolding plate 211 is formed in a rotary disk shape, a defect hardly occurs in the base, which is desirable.

The interfolding assisting plate 212 is disposed so as to be substantially parallel to the first base 201 transported by the first base transport means 223. The first base 201 having the sealant layer 201s formed on the lower side thereof passes over the interfolding assisting plate 212, and is supported by the interfolding assisting plate 212 during the interfolding process using the interfolding plate 211. The first base is interfolded in a valley-folding shape along the interfolding plate 211, and is interfolded in a mountain-folding shape along a side end portion 212s of the interfolding assisting plate 212 so as to form a mountain folding line 201c and a valley folding line 201d, where an S-shaped or Z-shaped interfolding shape is formed in one side, and a Ω-shaped interfolding shape is formed on both sides.

The interfolding assisting plate 212 according to the embodiment is supported by a support body 215 formed at the center of the lower surface thereof in the width direction. The support body 215 is provided at a position where the support body does not interfere with the interfolding plate 211.

As shown in FIGS. 18A, 18B, 19A, and 19B, in the case of manufacturing the seal film having one sheet of the handle portion from the first base 201 to have two chamfered portions, since a gap between left and right valley folding lines 201d and 201d is wide, a distance between the left and right interfolding plates 211 and 211 is large, and hence the support body 215 may exist therebetween.

As shown in FIGS. 20A to 21B, in the case of manufacturing the seal film having two sheets of handle portions, a gap between the left and right valley folding lines 201d and 201d is narrow and a distance between the left and right interfolding plates 211 and 211 needs to be small. Accordingly, in a space between the left and right interfolding plates 211 and 211, the support body 215 may be provided with an opening, a concave portion, or the like so as to prevent interference between the support body 215 and the interfolding plate 211.

In addition, a support plate 216 used for supporting a portion 201e on the outside of the valley folding line 201d of the first base 201 in the width direction may be provided below the interfolding assisting plate 212. In this case, the support plate 216 and the interfolding assisting plate 212 may be connected to each other by the support body 215.

The width of the interfolding assisting plate 212 is equal to the gap between the left and right mountain folding lines 201c and 201c.

For this reason, as shown in FIGS. 16A and 16B, it is desirable that the widths $W_1$ and $W_2$ of the interfolding assisting plate 212 be variable. In order to allow the width of the interfolding assisting plate 212 to be variable, the interfolding assisting plate 212 is formed by two or more members so that the respective members are movable in the width direction. Accordingly, it is possible to change the width by moving the positions of both end portions 212s and 212s of the interfolding assisting plate 212. Alternatively, when plural interfolding assisting plates 212 having different widths are provided, it is possible to select the interfolding assisting plate 212 having a desired width as occasion demands.

It is desirable that the surface of the interfolding plate 212 be formed to have low friction force relative to the first base 201. For example, the surface may be formed of a material (silicon or fluorine resin) having low friction relative to the base, or may be coated with a material (silicon coating or fluorine resin coating) having low friction. In addition, plural coros may be provided in the upper surface of the interfolding assisting plate 212 so as to reduce the friction force relative to the first base 201.

(Sealing Process)

After the interfolding process, the second base 202 formed of an elongated film having a sealant layer formed on at least one surface thereof overlaps with the first base 201 of which the sectional shape is an S-shaped, Z-shaped, or Ω-shaped interfolding shape, and the first base 201 is sealed to the second base 202. The second base 202 has the sealant layer 202s formed on a surface facing at least the first base 201, and in the sealing process, the sealant layers 201s and 202s of both bases overlap with each other so as to face each other. The both overlapping bases 201 and 202 are sealed by sealing means 213 while being transported by transport means 225 and 226. Accordingly, as shown in FIGS. 18A, 19A, 20A, and 21A, it is possible to obtain a laminated structure 203 formed by sealing the first and second bases 201 and 202.

As a method of sealing the base, heat sealing (thermal sealing), ultrasonic sealing, high-frequency sealing, or the like may be used. Among them, the heat sealing is desirable.

In addition, when a heat sealing operation is performed by using a hot plate in the sealing process, in order to prevent the outward protruding sealant layers of the first and second bases 201 and 202 from being melt-fixed to the hot plate or the like, it is desirable that a film (a polyethylene terephthalate (PET) film, a nylon film, a film or sheet treated by fluorine or silicon, or the like) which is not melt-fixed to the sealant layer be interposed.

When an elongated film which is the same as the first and second bases 201 and 202 is used as the film which is not melt-fixed to the sealant layer, it is possible to transport the film together with the bases 201 and 202 in an overlapping state before the sealing means 213.

(Punching Process)

As shown in FIGS. 18A, 19A, 20A, and 21A, at the time when the laminated structure 203 formed by sealing the first and second bases 201 and 202 is punched into a predetermined shape, the punching process is performed so that a folding line 204 (corresponding to the valley folding line 201d during the interfolding process) of the first base 201 contacting with the second base 202 is included in a punching area 207, thereby manufacturing the handle portion 205 formed by the sealed portions of the first base 201.

Accordingly, as shown in FIGS. 18B, 19B, 20B, and 21B, it is possible to obtain the seal film 206 having the handle portion 205.

The mountain folding line 201c during the folding process may be included in the punching area 207 or may not be included therein. When the mountain folding line 201c is not included in the punching area 207 as shown in FIGS. 18A, 18B, 20A, and 20B, a cutting surface of the first base 201 is exposed to the front end of the handle portion 205. When the mountain folding line 201c is included in the punching area 7 as shown in FIGS. 19A to 21B, the front end of the handle portion 205 has the interfolded portion corresponding to the mountain folding line 201c.

In the case where one side of the first base 201 is interfolded as shown in FIGS. 22A to 22C, the interfolding side of the laminated structure 3 is punched into a predetermined shape as shown in FIG. 23A or 23B.

The type of punching means is not particularly limited if the means punches the laminated structure 203 into a predetermined shape. For example, as shown in FIGS. 18A to 21B, since the positional relationship between the handle portion and the folding line may be different in accordance with the seal film to be formed, the positional relationship is appropriately set.

Since the punching position of the laminated structure 203 is different case by case as shown in FIGS. 18A, 19A, 20A, and 21A, the position of punching means 214 disposed in the seal film manufacturing device 210 is schematically depicted by two-dot chain line in FIGS. 14A and 14B.

In the case where the opening sealed by the seal film is provided in a cylindrical portion formed to have the opening in the front end thereof, it is desirable that the shape punching the seal film be formed to have a diameter substantially equal to an outer diameter of the cylindrical portion so that the outward protruding amount thereof is as small as possible. In addition, in the case where the opening sealed by the seal film is opened in a flat wall surface, it is desirable that the punching shape be formed to have a size in which a sealing width is ensured on the outside of the opening.

In addition, herein, although the punching process is performed on the center of the folding line 204 so that the folding line 4 is equal to the diameter of the circular portion of the seal film 206 upon permanufacturing the punching process, the punching process may be performed on a biased portion so that an area of the handle portion 205 is larger or smaller than a half of an area of the circular portion.

Further, herein, the punching shape is circular, but may be other shapes, that is, a polygonal shape such as an oval shape, a square shape, or a hexagonal shape. Furthermore, the shape of the seal film 6 may be formed by permanufacturing the punching process on the laminated structure 3 and removing a part of the outer peripheral portion of the handle portion 205.

As described above, in the method and device for manufacturing the seal film according to the seventh embodiment, since it is possible to change the size of the handle portion 205 of the seal film 206 or to change the number of sheets of the handle portions 205 by changing the position of the interfolding plate 211 and/or the width of the interfolding assisting plate 212, it is possible to easily form the handle portion 205 having a different size and a different number of sheets as occasion demands.

FIGS. 24A and 24B are A and B plan views showing the seal film manufacturing device according to the eighth embodiment of the invention. FIGS. 25A to 25F are sectional views respectively taken along the line $S_A$-$S_A$, the line $S_B$-$S_B$, the line $S_C$-$S_C$, the line $S_D$-$S_D$, the line $S_E$-$S_E$, and the line $S_F$-$S_F$ in FIG. 24B.

As shown in FIGS. 24A and 24B, the first base 201 is supplied from the first base supply means 221, and is sent out to be transported by the first transport means 223.

In addition, the second base 202 is supplied from second supply means (not shown), and is sent out by the second base transport means 224 so as to be transported to a position above the first base 201.

As shown in FIG. 24B, a seal film manufacturing device 230 according to the invention further includes an interfolding plate 231, an interfolding assisting plate 232, tab sealing means 233, and a folding back plate 234 as means for interfolding the first base 201.

(Interfolding Process)

As shown in FIGS. 24A to 25F, in the method of manufacturing the seal film according to the embodiment, in the state where the first base 201 formed of an elongated film having a sealant layer formed on one surface thereof follows the interfolding assisting plate 232, the interfolding plate 231 comes into contact with the first base 201 so that the first base 201 is interfolded outward in the width direction in a mountain-folding shape in a sectional view in a flow direction thereof.

The first base 201 is disposed such that the sealant layer contacts with the interfolding assisting plate 232 so as to allow the first bases to be sealed to each other, and is interfolded such that the sealant layer is the inside of the interfolded portion.

Herein, in order to obtain two chamfered portions of the seal film 206, both end portions 201t of the first base 201 are interfolded so as to be located on the inside in the width direction of the mountain folding lines 201c. However, in the invention, in order to obtain one chamfered portion of the seal film 206, the interfolding plate 231 may come into contact with one side of the first base 201 so as to interfold one side thereof.

Figure 25A:
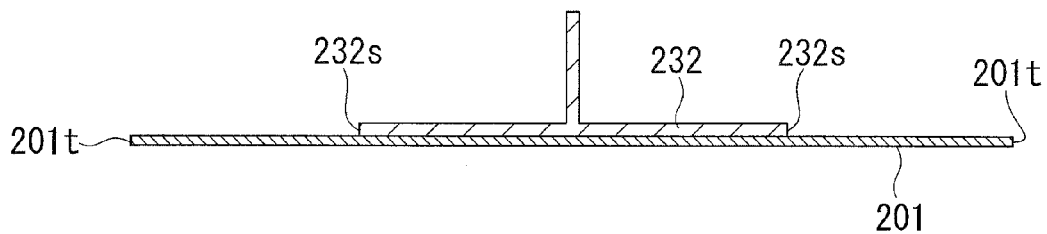
FIG. 25A is a sectional diagram taken along the line SA-SA in FIG. 24B.
Figure 25B:
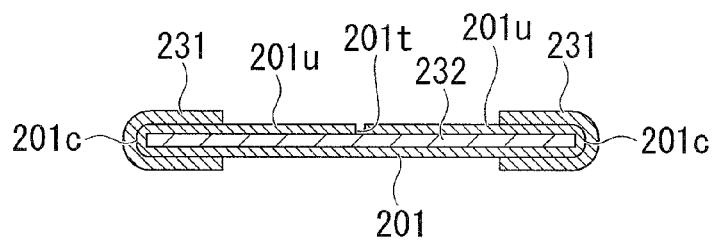
FIG. 25B is a sectional diagram taken along the line SB-SB in FIG. 24B.

As shown in FIG. 25B, the interfolding plate 231 is a plate-like member which has a U-shaped section and is disposed so as to surround side end portions 232s of the interfolding assisting plate 232. When the first base 201 passes through a gap having a substantially U-shaped section and formed between the interfolding plate 231 and the interfolding assisting plate 232, the first base 201 comes into contact with the inner surface of the interfolding plate 231 so as to be interfolded in a mountain-folding shape.

It is desirable that the interfolding plate 231 and the interfolding assisting plate 232 be horizontally provided.

In addition, it is desirable that the width of the interfolding assisting plate 232 be adjusted in accordance with the dimension of the seal film 206. In order to allow the width of the interfolding assisting plate 232 to be variable, the interfolding assisting plate 232 is formed by two or more members so that the respective members are movable in the width direction. Accordingly, it is possible to change the width by moving the positions of both end portions 232s and 232s of the interfolding assisting plate 232.

Alternatively, when plural interfolding assisting plates 232 having different widths are provided, it is possible to select the interfolding assisting plate 232 having a desired width as occasion demands.

It is desirable that the surfaces of the interfolding plate 231 and the interfolding assisting plate 232 be formed to have low friction force relative to the first base 201.

For example, the surface may be formed of a material (silicon or fluorine resin) having low friction relative to the base, or may be coated with a material (silicon coating or fluorine resin coating) having low friction.

In addition, plural coros may be provided in the interfolding assisting plate 232 so as to reduce the friction force relative to the first base 1.

Figure 25C:
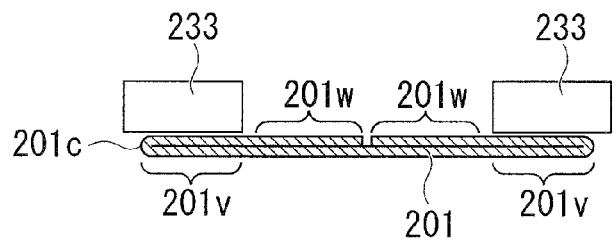
FIG. 25C is a sectional diagram taken along the line SC-SC in FIG. 24B.

Next, as shown in FIG. 25C, a mountain-shaped folding back portion 201u is sealed by the tab sealing means 233 (first sealing means), thereby manufacturing a portion 201v in which the first bases 201 are sealed to each other.

The seal width of the portion 201v formed by sealing the first bases 201 to each other needs to be not less than the length of the handle portion 205, and the seal width is set to be wide when the length of the handle portion 205 is set to be long.

At this time, an unsealed portion 201w is left between the portion 201v formed by sealing the first bases 201 to each other and the end portion 201t of the first base 201.

As the tab sealing means 233, ultrasonic sealing means, high-frequency sealing means, or the like may be used in addition to heat sealing means such as a seal bar or a seal roll.

Figure 25D:
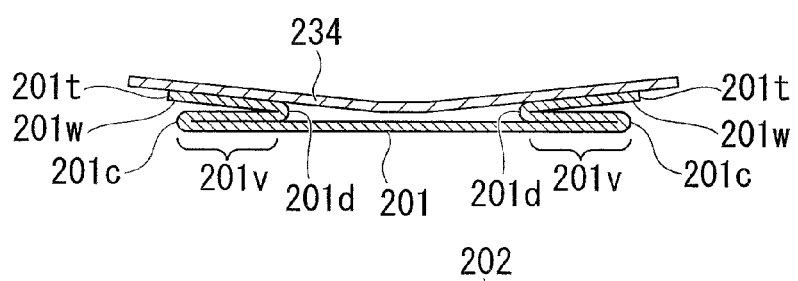
FIG. 25D is a sectional diagram taken along the line SD-SD in FIG. 24B.

Next, as shown in FIG. 25D, the unsealed portion 201w on the side of the end portion 201t of the first base 201 comes into contact with the folding back plate 234 so as to be folded back outward in the width direction in a valley-folding shape in a sectional view in a flow direction relative to the sealed portion 201v formed by sealing the first bases 201 to each other.

Since the edge of the sealed portion 201v is used as a folding back line, it is possible to easily and reliably control the width of the portion 201v formed by sealing the first bases 201 manufacturing the handle portion by using the width obtained by the sealing process.

At this time, the valley folding line 201d is formed by the folding line, and the first base 201 has a Ω-shaped interfolding shape in a sectional view in a flow direction.

As described above, in the case where the interfolding plate 231 is used for only one side of the first base 201 and only the one side is interfolded, the unsealed portion 201w on the side of the end portion 201t of the first base 201, that is, the one side is interfolded. As a result, the first base 201 has an S-shaped or Z-shaped sectional shape.

It is desirable that the surface of the folding back plate 234 be formed to have low friction force relative to the first base 201. For example, the surface may be formed of a material (silicon or fluorine resin) having low friction relative to the base, or may be coated with a material (silicon coating or fluorine resin coating) having low friction.

(Sealing Process and Punching Process)

Figure 25E:
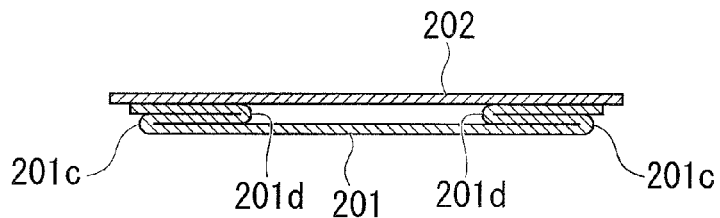
FIG. 25E is a sectional diagram taken along the line SE-SE in FIG. 24B.

After the interfolding process, as shown in FIG. 25E, the second base 202 formed of an elongated film having a sealant layer formed on at least one surface thereof overlaps with the first base 201 of which the sectional shape is an S-shaped, Z-shaped, or Ω-shaped interfolding shape, and the first base 201 is sealed to the second base 202.

The second base 202 has the sealant layer 202s formed on a surface facing at least the first base 201, and in the sealing process, the sealant layers 201s and 202s of both bases overlap with each other so as to face each other.

The both overlapping bases 201 and 202 are sealed by sealing means 213 while being transported by transport means 225 and 226.

Figure 25F:
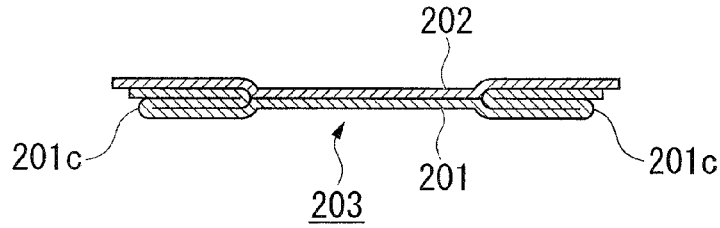
FIG. 25F is a sectional diagram taken along the line SF-SF in FIG. 24B.

Accordingly, as shown in FIG. 25F, it is possible to obtain a laminated structure 203 formed by sealing the first and second bases 201 and 202.

The laminated structure 203 formed by the eighth embodiment has the same configuration as that of the laminated structure 203 according to the seventh embodiment. The sealing means 213 (second sealing means) between bases for manufacturing the laminated structure 203 and the punching means 214 punching the laminated structure 203 to form the handle portion 205 formed by the portion 201v formed by sealing the first bases to each other may be the same as those of the seventh embodiment.

Figure 18A:
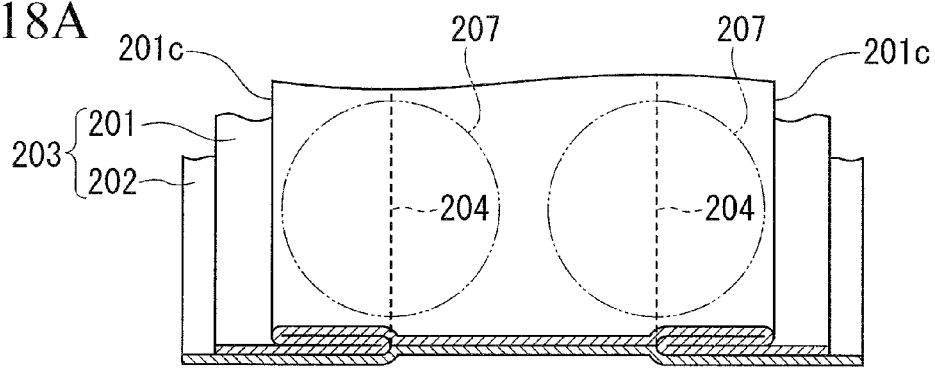
FIG. 18A is a partially plan diagram illustrating an example of a punching position of the seal film having one sheet of handle portion.
Figure 18B:
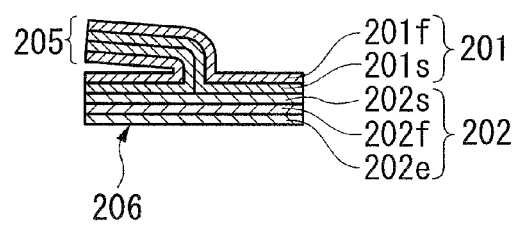
FIG. 18B is a sectional diagram showing the punched seal film.
Figure 19A:
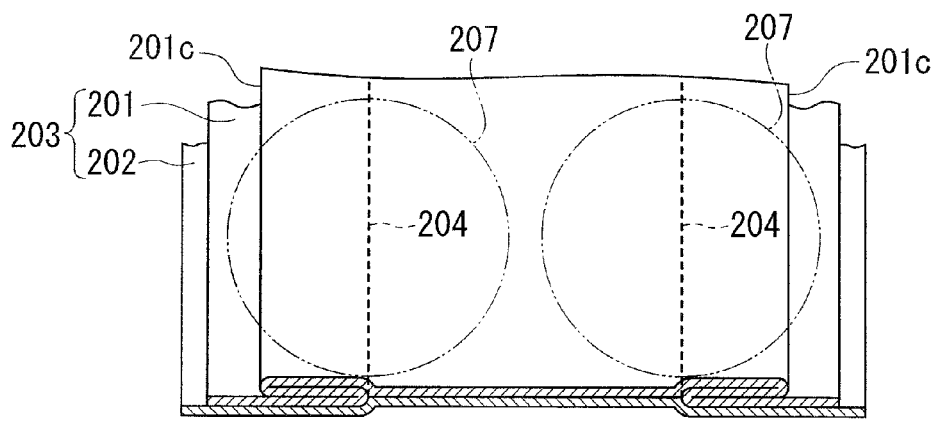
FIG. 19A is a partially plan diagram illustrating another example of the punching position of the seal film having one sheet of handle portion.
Figure 19B:
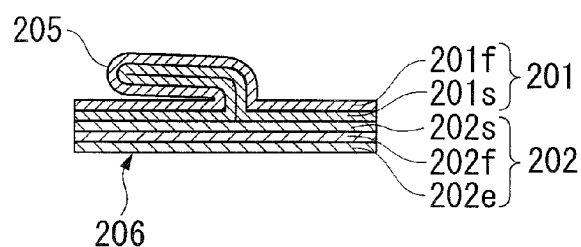
FIG. 19B is a sectional diagram showing the punched seal film.
Figure 20A:
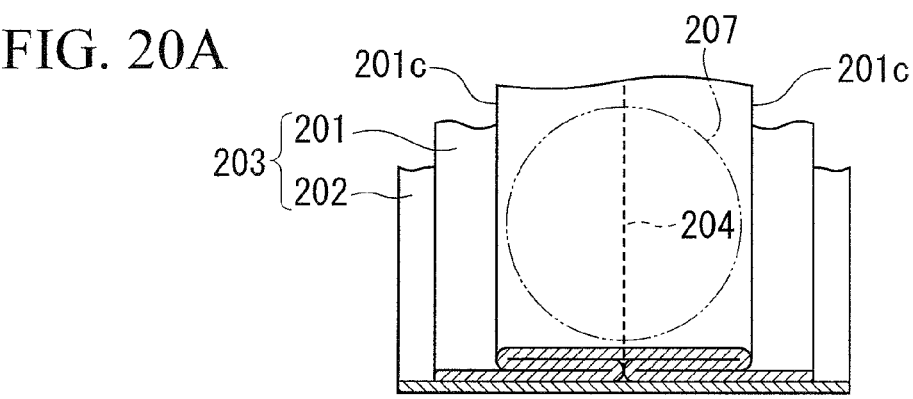
FIG. 20A is a partially explanatory diagram illustrating an example of the punching position of the seal film having two sheets of handle portions.
Figure 20B:
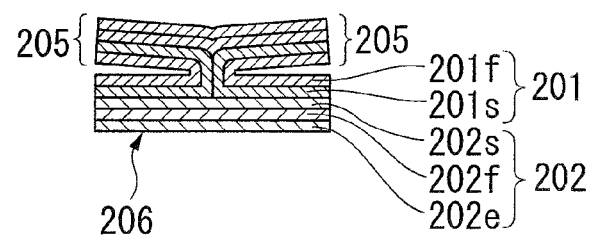
FIG. 20B is a sectional diagram showing the punched seal film.
Figure 21A:
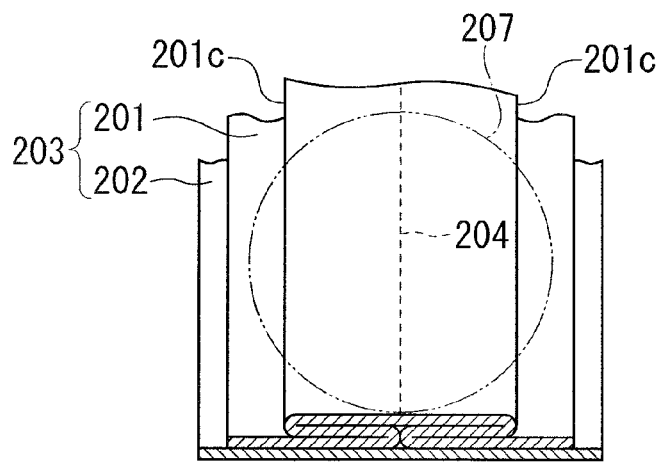
FIG. 21A is a partially plan diagram illustrating another example of the punching position of the seal film having two sheets of handle portions.
Figure 21B:
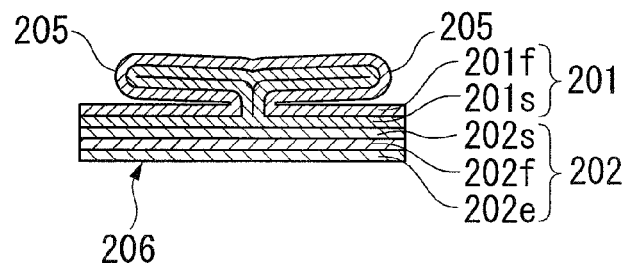
FIG. 21B is a sectional diagram showing the punched seal film.

When the punching process is performed on the laminated structure 203, as shown in FIGS. 18B and 19B, it is possible to obtain the seal film 206 having the handle portion 205.

The mountain folding line 201c during the folding process may be included in the punching area 207 or may not be included therein. When the mountain folding line 201c is not included in the punching area 207 as shown in FIG. 18A, a cutting surface of the first base 201 is exposed to the front end of the handle portion 205. When the mountain folding line 201c is included in the punching area 207 as shown in FIG. 19A, the front end of the handle portion 205 has the interfolded portion corresponding to the mountain folding line 201c.

In the case where the interfolding plate 231 is used for only one side of the first base 201 and the only one side is interfolded, as shown in FIG. 23A or 23B, the interfolded portion of the laminated structure 203 is punched in a predetermined shape.

As described above, in the method and device for manufacturing the seal film according to the eighth embodiment, it is possible to form the seal film 206 having the handle portion 205 which is the same as that of the seventh embodiment.

In addition, since it is possible to change the size of the handle portion of the seal film by changing the seal width of the mountain-shaped folding back portion and/or the width of the interfolding assisting plate 232, it is possible to easily form the handle portion having a different size as occasion demands.

<Seal Film>

It is possible to use the seal film 206 formed by the embodiment as a seal for closing the opening in such a manner that the outer peripheral edge is sealed to the peripheral edge of the opening of the container. In addition, it is possible to use the seal film as an inner seal used inside the cap in the case where the cap is mounted to the cylindrical portion of the container.

In the case of opening the container, it is possible to easily open the container by gripping the handle portion 205 of the seal film 206 using a finger or the like to be separated therefrom. In the case of the seal film 206 formed by the invention, since the handle portion 205 is formed so as to protrude upward from the opening of the container, it is easy to grip the handle portion 205.

In addition, at the time when the inner seal attachment container is formed by using the seal film according to the embodiment, in the case of using the seal films 206 having the high-frequency heating layer formed in the base layer 202f of the second base 202, a method may be used which disposes the seal film 206 having the handle portion 205 on the peripheral edge of the opening of the container so that the second base 202 faces downward; mounts the cap to the opening of the container; and then seals a gap between the seal film 206 and the peripheral edge of the opening of the container through the high-frequency induction heating process in the state where the seal film 206 comes into press contact with the peripheral edge of the opening of the container in the inside of the cap.

Accordingly, since the seal film is positioned to the peripheral edge of the opening of the container by means of the inner surface of the cap, it is possible to easily perform the positioning operation of the seal film.

In this case, in order to allow the high frequency to arrive at the high-frequency heating layer inside the second base, at least the cylindrical portion of the container and the cap are formed of an insulating material such as plastic.

In addition, in the case of using the seal films 206 not having the high-frequency heating layer formed in the second base, a method may be used which places a third base having the same shape as the punching shape of the seal film 206 and having sealant layers formed on both surfaces thereof and a high-frequency heating layer formed therein on the peripheral edge of the opening of the container; disposes the seal film 206 having the handle portion 205 on the third base so that the second base 202 faces downward; mounts the cap to the opening of the container; and then seals a gap between the seal film 206 and the third base and a gap between the third base and the peripheral edge of the opening of the container through the high-frequency induction heating process in the state where the seal film 206 and the third base come into press contact with the peripheral edge of the opening of the container in the inside the cap.

Accordingly, since the seal film is positioned to the peripheral edge of the opening of the container by means of the inner surface of the cap, it is possible to easily perform the positioning operation of the seal film.

In this case, in order to allow the high frequency to arrive at the high-frequency heating layer inside the third base, at least the cylindrical portion of the container and the cap are formed of an insulating material such as plastic.

As a method of placing the seal film 206 on the peripheral edge of the opening of the container, desirably a method may be used which loads the seal film 206 having the handle portion 205 facing downward in the inside of the cap in advance, and mounts the cap loaded with the seal film to the opening.

Thus, as a method of placing the third base and the seal film 206 on the peripheral edge of the opening of the container, desirably a method may be used which sequentially loads the seal film 206 having the handle portion 205 facing downward and the third base in the inside of the cap in advance, and mounts the cap loaded with the seal film and the third base to the opening of the container.

Likewise, according to the method of loading an object, which is to be placed on the peripheral edge of the opening of the container, in the inside of the cap in advance and mounts the cap to the opening of the container, it is possible to easily perform the method using an automatic machine compared with the method which places the seal film or the third base and the seal film on the peripheral edge of the opening of the container and mounts the empty cap thereto.

In addition, at the time when the inner seal attachment container is formed by using the seal film 206 according to the embodiment, in the case of using the seal films 206 having the high-frequency heating layer formed in the base layer 202f of the second base 202, a fourth base having both sealable surfaces may be interposed between the second base and the peripheral edge of the opening of the container and the seal film 206 may be placed thereon.

In this case, the seal film 206 having the handle portion 205 facing downward and the fourth base having both sealable surfaces are sequentially loaded in the inside the cap, the cap loaded with the seal film 206 and the fourth base is mounted to the opening of the container, and then the high-frequency induction heating process is performed in the state where the seal film comes into press contact with the peripheral edge of the opening of the container inside the cap.

Accordingly, a gap (a gap between the lower surface of the seal film and the upper surface of the fourth base, and a gap between the lower surface of the fourth base and the peripheral edge of the opening of the container) from the seal film to the peripheral edge of the opening of the container is sealed mutually by heat generated by high frequency from the inside of the second base.

In addition, in the case of using the seal films 206 not having the high-frequency heating layer formed in the second base, a fourth base having both sealable surfaces may be interposed between the third base and the peripheral edge of the opening of the container, and the third base and the seal film 206 may be placed thereon.

In this case, the seal film 206 having the handle portion 205 facing downward, the third base formed in the same shape as the punching shape of the seal film 206 having the sealant layer formed on both surfaces thereof and having the high-frequency heating layer formed therein, and the fourth base having both sealable surfaces are sequentially loaded in the inside of the cap, the cap in which the third base and the fourth base are loaded on the seal film 206 is mounted to the opening of the container, and then the high-frequency induction heating process is performed in the state where the seal film comes into press contact with the peripheral edge of the opening of the container in the inside the cap.

Accordingly, a gap (a gap between the lower surface of the seal film and the upper surface of the third base, a gap between the lower surface of the third base and the upper surface of the fourth base, and a gap between the lower surface of the fourth base and the peripheral edge of the opening of the container) from the seal film to the peripheral edge of the opening of the container is sealed mutually by heat generated by high frequency from the inside of the third base.

The fourth base is formed of a sealable member such as a thermoplastic resin, but particularly, it is desirable that seal strength between the fourth base and the peripheral edge of the opening of the container be strong.

Accordingly, after separating the seal film 206 by gripping the handle portion 205, the fourth base is left on the side of the peripheral edge of the opening of the container.

The fourth base may be provided with an opening having a polygonal shape, a star shape, or a circular shape, or an opening having plural holes or a meshed shape. Accordingly, it is possible to control the flow of the contents poured out from the container by using the opening.

For example, in the case where the contents are viscous materials such as mayonnaise, a peripheral edge of the opening is formed in an appropriate shape so as to pour out the contents from the container in the state where the sectional shape thereof is formed in a particular shape such as a star shape.

Next, the ninth embodiment, the tenth embodiment, and the eleventh embodiment of the invention will be described with reference to FIGS. 26A to 29C.

Figure 26A:
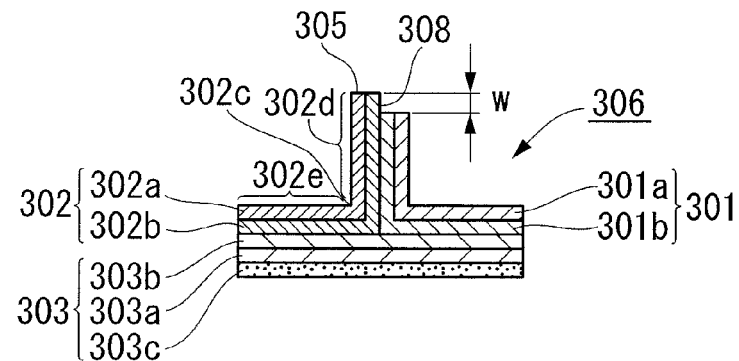
FIG. 26A is a sectional diagram showing an inner seal member according to the ninth embodiment and the eleventh embodiment of the invention.
Figure 26B:
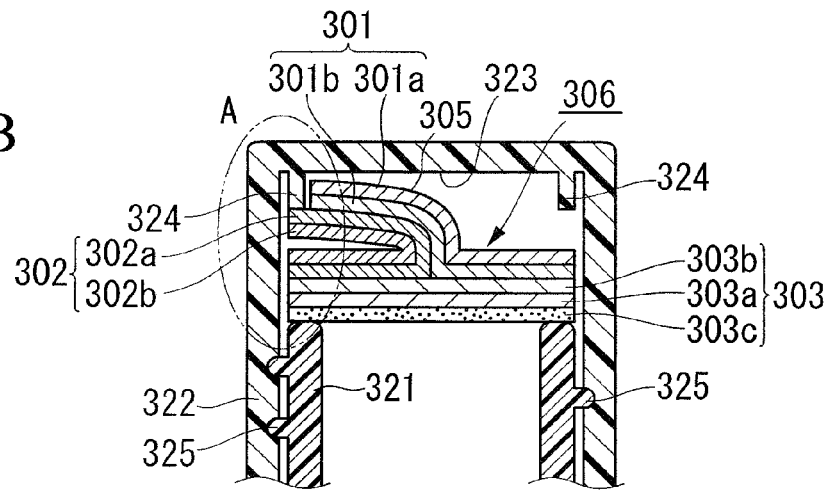
FIG. 26B is a sectional diagram showing the vicinity of the opening of the cap attachment container sealed by the inner seal member in FIG. 26A.
Figure 26C:
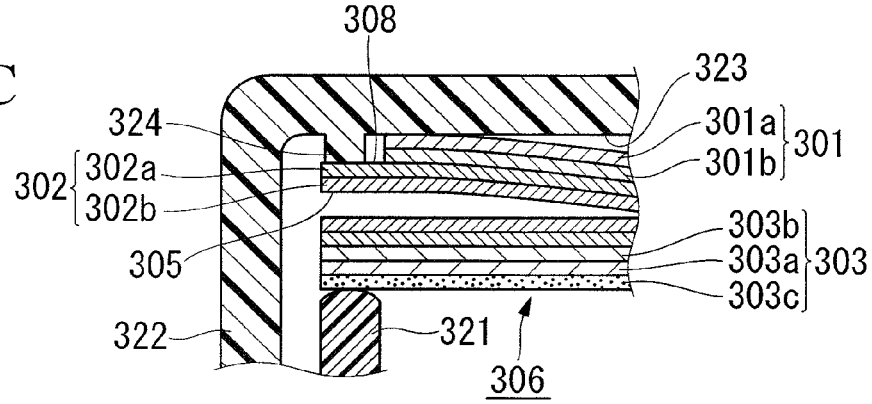
FIG. 26C is an enlarged sectional diagram showing an A part in FIG. 26B.

FIG. 26A is a sectional view showing an inner seal member according to the ninth embodiment and the eleventh embodiment of the invention. FIG. 26B is a sectional view showing the vicinity of the opening of the cap attachment container sealed by the inner seal member in FIG. 26A. FIG. 26C is an enlarged sectional view showing an A part in FIG. 26B.

Figure 27A:
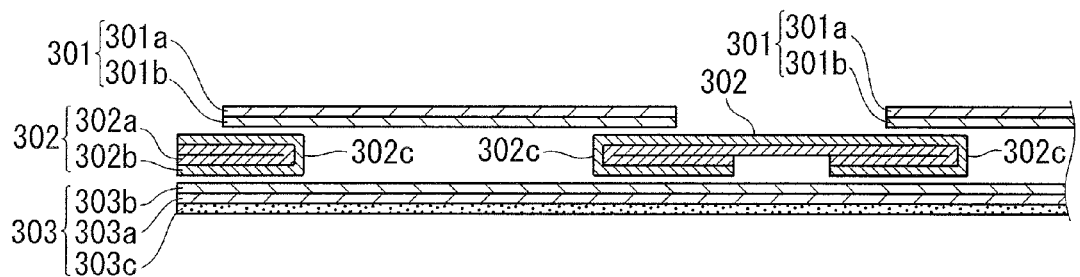
FIG. 27A is a diagram illustrating a method of manufacturing an inner seal member according to the ninth embodiment and the eleventh embodiment of the invention, and a sectional view illustrating the base overlapping process.
Figure 27B:
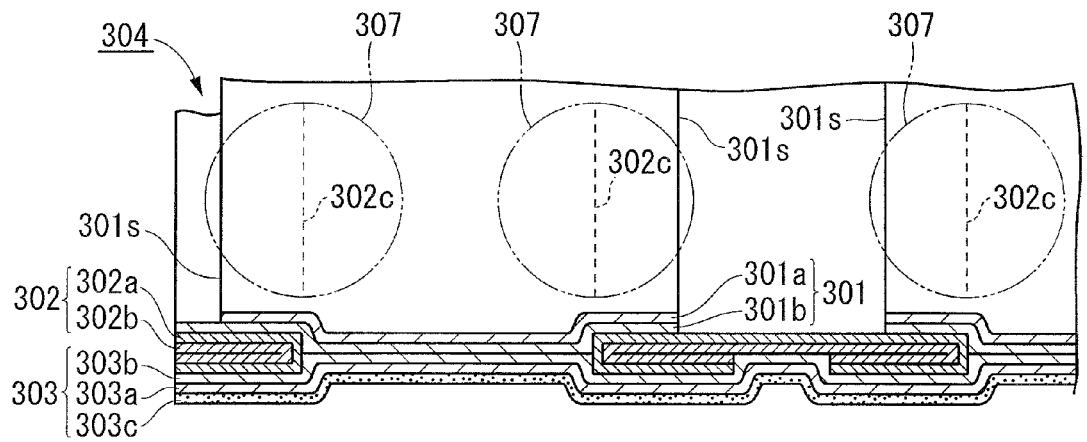
FIG. 27B is a diagram illustrating the method of manufacturing the inner seal member according to the ninth embodiment and the eleventh embodiment of the invention, and a partially perspective sectional diagram showing the laminated structure obtained by the sealing of the respective bases and a punching area thereof.
Figure 27C:
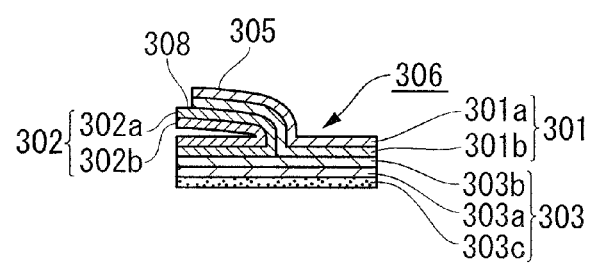
FIG. 27C is a sectional diagram showing the method of manufacturing the inner seal member according to the ninth embodiment and the eleventh embodiment of the invention, and a sectional diagram showing the inner seal member obtained by punching.
Figure 27D:
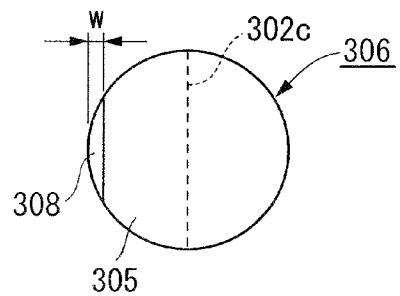
FIG. 27D is a diagram showing the method of manufacturing the inner seal member according to the ninth embodiment and the eleventh embodiment of the invention, and a plan diagram showing the inner seal member.

FIGS. 27A to 27D are diagrams illustrating the method of manufacturing the inner seal member according to the ninth embodiment and the eleventh embodiment of the invention. FIG. 27A is a sectional view illustrating the base overlapping process. FIG. 27B is a partially perspective sectional view showing the laminated structure obtained by the sealing of the respective bases and a punching area thereof. FIG. 27C is a sectional view showing the inner seal member obtained by punching. FIG. 27D is a plan view showing the inner seal member.

Figure 28A:
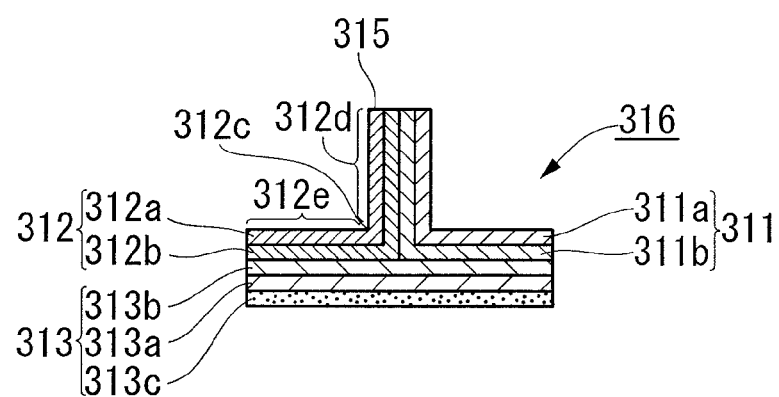
FIG. 28A is a sectional diagram showing the inner seal member according to the tenth embodiment of the invention.
Figure 28B:
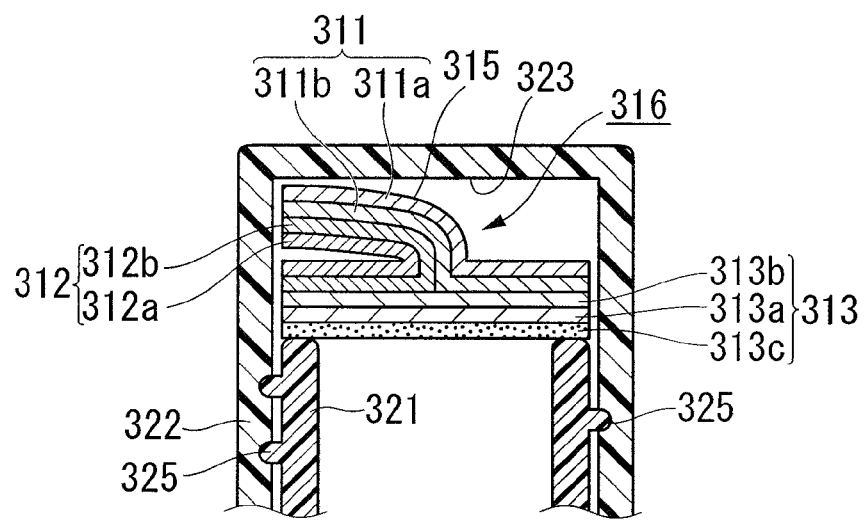
FIG. 28B is a sectional diagram showing the vicinity of the opening of the cap attachment container sealed by the inner seal member in FIG. 28A.

FIG. 28A is a sectional view showing the inner seal member according to the tenth embodiment of the invention. FIG. 28B is a sectional view showing the vicinity of the opening of the cap attachment container sealed by the inner seal member in FIG. 28A.

Figure 29A:
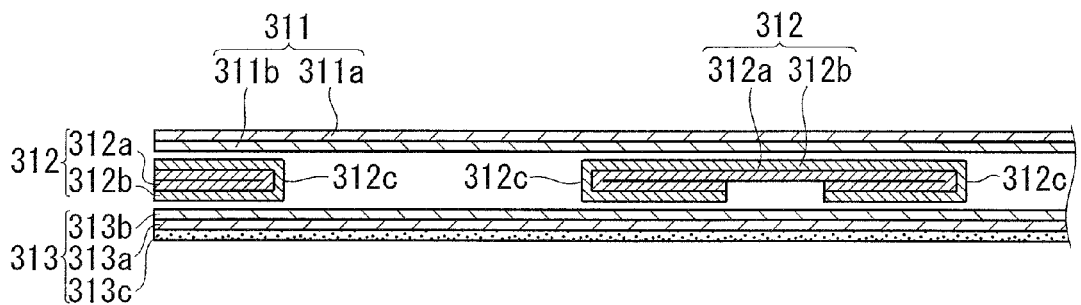
FIG. 29A is a diagram illustrating the method of manufacturing the inner seal member according to the tenth embodiment of the invention, and a sectional view illustrating the base overlapping process.
Figure 29B:
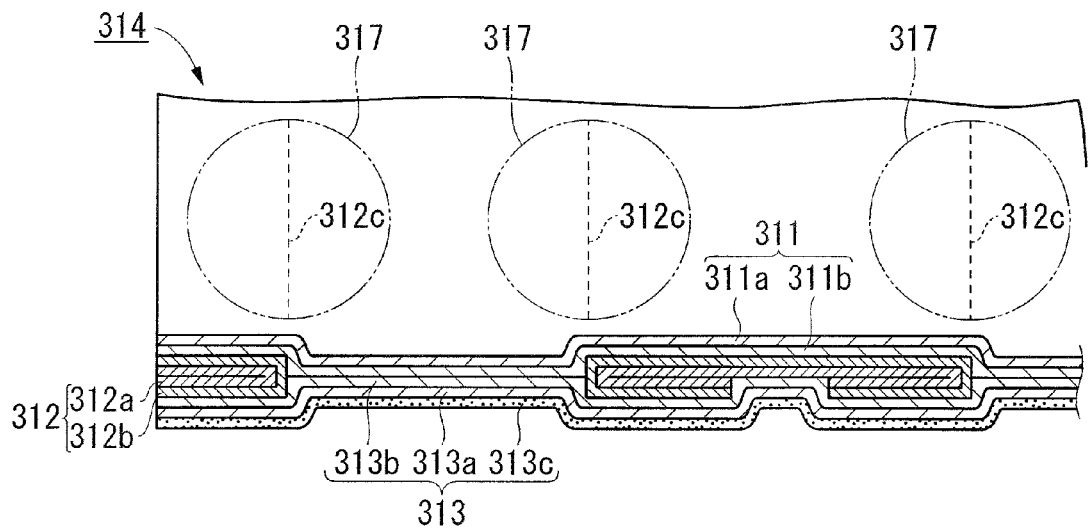
FIG. 29B is a diagram illustrating the method of manufacturing the inner seal member according to the tenth embodiment of the invention, and a partially perspective diagram showing the laminated structure obtained by the sealing of the respective bases and the punching area thereof.
Figure 29C:
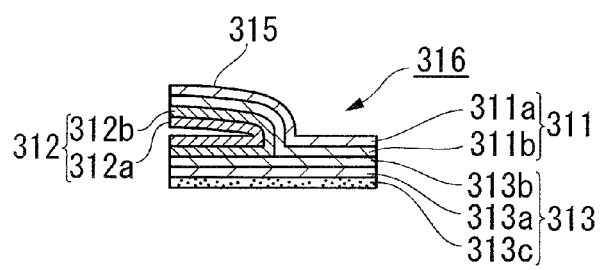
FIG. 29C is a diagram illustrating the method of manufacturing the inner seal member according to the tenth embodiment of the invention, and a plan view of a sectional diagram showing the inner seal member obtained by punching.

FIGS. 29A to 29C are diagrams illustrating the method of manufacturing the inner seal member according to the tenth embodiment of the invention. FIG. 29A is a sectional view illustrating the base overlapping process. FIG. 29B is a partially perspective view showing the laminated structure obtained by the sealing of the respective bases and the punching area thereof. FIG. 29C is a plan view of a sectional view showing the inner seal member obtained by punching.

The inner seal member according to the ninth embodiment of the invention is an inner seal member having a handle portion formed in a shape not protruding from the opening of the container, and a sealant layer of a base manufacturing the handle portion is exposed to a part of the front end of the handle portion.

The inner seal member according to the tenth embodiment of the invention is an inner seal member having a handle portion formed in a shape not protruding from the opening of the container. The handle portion is formed by laminating a part of the first base on the one-side portion of the second base divided into two portions by the folding line. The second base has the compressive strength (unit: N) using a ring crush method prescribed in JIS P8126 larger than that of the first base.

The inner seal member according to the eleventh embodiment of the invention is an inner seal member having a handle portion formed in a shape not protruding from the opening of the container. The handle portion is formed by laminating a part of the first base on the one-side portion of the second base divided into two portions by the folding line. The second base has the compressive strength (unit: N) using a ring crush method prescribed in JIS P8126 larger than that of the first base. In addition, a sealant layer manufacturing the handle portion is exposed to a part of the front end of the handle portion.

First bases 301 and 311 and second bases 302 and 312 are respectively formed of elongated films each having a sealant layer formed on one surface thereof, and respectively include two layers of at least base layers 301a, 302a, 311a, and 312a and sealant layers 301b, 302b, 311b, and 312b. The sealant layer may be formed by one or two types or more of a polyolefin-based resin such as polyethylene (PE), polypropylene (PP), or ethylene-acetic acid vinylic copolymer (EVA).

In addition, as a base layer, the combination of a single layer or a multi layer formed of a polyester-based resin such as polyethylene terephthalate (PET) or a polyamide-based resin such as nylon (NY) may be used. Among them, a stretching film is desirable. The first and second bases may further include one or two or more of a gas barrier layer, a printing layer, an adhesive layer, a function layer, and the like between the base layer and the sealant layer or on the surface of the base layer.

In the ninth embodiment of the invention, the first and second bases may have the same configuration.

In the tenth and eleventh embodiments of the invention, the first and second bases has a difference in the compressive strength using the ring crush method prescribed in JIS P8126.

Next, measurement values of the compressive strength (ring crush method) of various films are shown as the specific example.

TABLE 1

COMPRESSIVE STRENGTH OF LAMINATED FILM

| No. | CONFIGURATION | THICKNESS CONFIGURATION | COMPRESSIVE STRENGTH |
| --- | --- | --- | --- |
| 1 | PET/PE | 12 μm/25 μm | 1.3 N |
| 2 | PET/NY/PE | 12 μm/15 μm/30 μm | 5.5 N |
| 3 | PET/NY/PE | 12 μm/15 μm/50 μm | 8.6 N |
| 4 | NY/PE | 15 μm/60 μm | 14.6 N |
| 5 | NY/PE | 15 μm/120 μm | 35.0 N |

TABLE 2

COMPRESSIVE STRENGTH OF SINGLE FILM

| No. | CONFIGURATION | COMPRESSIVE STRENGTH |
| --- | --- | --- |
| 1 | PET 12 μm | 0.4 N |
| 2 | PET 16 μm | 0.7 N |
| 3 | PET 25 μm | 2.0 N |
| 4 | PET 38 μm | 8.6 N |
| 5 | PE 45 μm | 1.0 N |
| 6 | PE 100 μm | 5.6 N |
| 7 | PE 130 μm | 13.2 N |
| 8 | NY 15 μm | 0.6 N |

In the invention, the first base or the second base arbitrarily have the large compressive strength, but when the compressive strength of the first base is larger than that of the second base, the following combination may be exemplified as the configuration example of the base.

(1) In relation to the first base: PET 12 μm/PE 25 μm (compressive strength of 1.3 N), the second base: PET 12 μm/NY 15 μm/PE 50 μm (compressive strength of 8.6 N)

(2) In relation to the first base: PET 12 μm/NY 15 μm/PE 30 μm (compressive strength of 5.5 N), the second base: NY 15 μm/PE 60 μm (compressive strength of 14.6 N)

(3) In relation to the first base: PET 12 μm/NY 15 μm/PE 50 μm (compressive strength of 8.6 N), the second base: NY 15 μm/PE 60 μm (compressive strength of 14.6 N)

It is desirable that a difference in the compressive strength between the first and second bases be 5 N or more.

As shown in Table 2, it is understood that the compressive strength increases in accordance with an increase in the film thickness. In addition, as a result of the comparison between Table 1 and Table 2, the compressive strength is large in the lamination configuration compared with the case of simply adding the compressive strength of the single film.

In the above-described configuration example, the example is shown in which the compressive strength increases by increasing the thickness of the PE as the sealant layer. However, when the thickness of the PE layer increases, the criticality that the melted PE may protrude from the periphery thereof during the sealing process to be thereby melt-fixed to an undesired portion increases. For this reason, it is desirable to increase the compressive strength by increasing the thickness of the base layer such as PET or NY.

For example, in the configuration example described in Table 1, in the case of increasing the thickness of the base layer, it is desirable to increase the compressive strength by changing the PET of 12 μm to the PET of 25 μm or the PET of 38 μm.

As the configuration example of this laminated film, a configuration of PET 25 μm/PE 25 μm, a configuration of PET 38 μm/PE 25 μm, a configuration of PET 25 μm/NY 15 μm/PE 30 μm, a configuration of PET 38 μm/NY 15 μm/PE 30 μm, a configuration of PET 25 μm/NY 15 μm/PE 50 μm, a configuration of PET 38 μm/NY 15 μm/PE 50 μm, or the like may be exemplified.

Third bases 303 and 313 are respectively formed of elongated films each having at least a sealant layer formed on one surface thereof. As this kind of film, in addition to a film (single-layer film) formed by a single sealant layer, a multi-layered film having a sealant layer formed on one surface or both surfaces may be used.

The second base may include a base layer. As a base layer, the combination of a single layer or a multi layer formed of a polyester-based resin such as polyethylene terephthalate (PET) or a polyamide-based resin such as nylon (NY) may be used. Among them, a stretching film is desirable.

The third bases 303 and 313 may include a layer (high-frequency heating layer) which can be heated by high frequency, and as the high-frequency heating layer, metal foil such as aluminum foil may be used.

In the ninth and eleventh embodiments of the invention, it is desirable to provide the high-frequency heating layer in order to perform the high-frequency sealing process upon melt-fixing a part of the front end of the handle portion to the inner surface of the ceiling surface of the cap.

In the inner seal member according to the ninth and eleventh embodiments, in the case where the high-frequency heating layer is not provided, it is possible to perform the high-frequency heating process by overlapping other bases having the high-frequency heating layer upon loading the inner seal member in the inside of the cap.

In the inner seal member according to the tenth embodiment of the invention, since the handle portion is not melt-fixed to the cap, the inner seal member is sealed to the opening of the container, and then the cap is mounted to the opening of the container. Accordingly, it is possible to use other sealing methods instead of the high-frequency sealing method, and it is not necessary to provide the high-frequency heating layer.

In addition, the lower surfaces (when the surfaces sealed to the first and second bases are set to the upper surface, the opposite surface thereof) of the third bases 303 and 313 are surfaces sealed to the container, and it is desirable that a material having an easy peeling property be used for the surface so as to be easily opened. The third base may further include one or two or more of a gas barrier layer, a printing layer, an adhesive layer, a layer assigning functional, and the like.

FIGS. 26A to 29C show the configuration of the sealant layer, the high-frequency heating layer, and the easy peel layer, where sealant layers 303b and 313b are provided in the surfaces where the third bases 303 and 313 are respectively sealed to the first and second bases, easy peel layers 303c and 313c are provided in the surfaces sealed to the opening of the container, and base layers or high-frequency heating layers 303a and 313a are provided therebetween.

In addition, as configuration examples of other multi-layered films, there are various configurations such as a configuration of a sealant layer and a high-frequency heating layer, a configuration of a sealant layer and a base layer, and a configuration of a sealant layer, a high-frequency heating layer, and an easy peel layer.

As the above-described gas barrier layer, a ceramic deposition film formed by depositing ceramic such as alumina ($Al_2O_3$) or silica ($SiOx$), a metal layer such as aluminum, or a gas barrier resin layer such as ethylene-vinyl alcohol copolymer (EVOH) or vinylidene chloride may be used.

When the gas barrier layer is provided, it is desirable that the conservative property of the contents be improved by suppressing a gas such as oxygen or vapor from passing through the film.

As shown in FIGS. 26A to 26C, an inner seal member 306 according to the ninth embodiment of the invention includes a handle portion 305 having a shape not protruding from a container opening 321. A sealant layer 302b of a base 2 manufacturing the handle portion 305 is exposed to a part 308 of the front end of the handle portion 305. In addition, a cap 322 is formed of a resin which can be melt-fixed to the sealant layer 302b.

In the inner seal member 306 according to the ninth embodiment, the handle portion 305 is formed by laminating a part of the first base 301 on the one-side portion of the second base 302 which is divided into two portions 302d and 302e by a folding line 302c.

The second base 302 which is the interfolding-side portion includes the sealant layers 302b facing an inner-side ceiling surface 323 of the cap 322. The first base 301 having a one surface facing the inner-side ceiling surface 323 of the cap 322 mounted to the container opening 321 shields the sealant layer 302b of the second base 302 in a portion other than an exposed portion 308.

In the embodiment (and the eleventh embodiment to be described later), in the bases 301 and 302 manufacturing the handle portion 305, since the base 302 as the interfolding-side portion and the base 301 having a surface facing the inner-side ceiling surface 323 of the cap 322 is distinguished from each other depending on whether the interfolding process is performed upon manufacturing the inner seal member, it is advantageous in that it is not necessary to interfold the handle portion 305 again in a predetermined direction upon sealing the container opening 322 by using the inner seal member 306 and to promptly use the inner seal member 306 as the seal for the container opening 322.

In addition, a process of interfolding the handle portion 305 so that the exposed portion 308 of the sealant layer of the front end of the handle portion 305 faces the inner-side ceiling surface 323 of the cap 322 may be provided between a process of manufacturing the inner seal member 306 and a process of sealing the container opening 322.

In addition, in the embodiment (and the eleventh embodiment to be described later), an entire thickness-direction part of the first base 301 in the exposed portion 308 is removed, and the sealant layer 302b of the base 302 as the interfolding-side portion is exposed to the front end of the handle portion 305 so as to face the inner-side ceiling surface 323 of the cap 322.

Alternatively, a part of the sealant layer 301b of the first base 301 which is not the interfolding-side portion may be exposed so as to face the inner-side ceiling surface 323 of the cap 322 by folding back the first base 301 so that the sealant layer 301b faces outside from the front end of the handle portion 305 or peeling and removing a part of the base layer 301a of the first base 301.

In the inner seal member 306 according to the ninth embodiment, it is desirable that the inner seal member 306 on the side of the container opening 321 has the base 303 having the high-frequency heating layer 303a.

In this case, the inner seal member 306 is placed on the container opening 321, the cap 322 is mounted again to the container opening 321, and then the inner seal member 306 is sealed to the container opening 321 through the high-frequency sealing process in the state where the inner seal member 306 is accommodated inside the cap 322.

At this time, in the inner seal member 306, since the front end of the handle portion 305 has the exposed portion 308 of the sealant layer 302b facing the inner-side ceiling surface 323, as shown in FIGS. 27B and 27C, the front end of the handle portion 305 is melt-fixed to the inner-side ceiling surface 323 of the cap 322 through the sealant layer 302b exposed to the exposed portion 308 during the high-frequency sealing process.

Accordingly, since the cap 322 is lifted up together with the handle portion 305 so that the handle portion 305 stands up upon separating the cap 322 from the container opening 321, it is easy to grip the handle portion 305 in the case of peeling the inner seal member 306 from the container opening 321 to be opened.

As a method of placing the inner seal member 306 on the container opening, desirably a method may be used which loads the inner seal member having the handle portion facing downward and mounts the cap loaded with the inner seal member 306 to the container opening.

According to this method, it is possible to easily perform the method using an automatic machine compared with a method which places the inner seal member on the peripheral edge of the opening of the container and mounts the cap thereto.

In the case of the high-frequency sealing process, in order to allow the high frequency to arrive at the metal layer, it is desirable that the vicinity of at least the opening of the container and the cap be formed of an insulating material such as plastic.

In the case of the melt-fixing operation using the high-frequency sealing process, since the inner-side ceiling surface 323 of the cap 322 is provided with an annular protrusion 324 used for pressing the inner seal member 306 toward the container opening 321, this portion is melt-fixed to the exposed portion 308 of the sealant layer 302b. Even when the width w of the exposed portion 308 is large, since the maximum pressing width corresponds to the width of the protrusion 324, the inner-side ceiling surface 323 of the cap 322 is peeled from the handle portion in the state where the cap 322 is lifted up.

For this reason, after separating the cap 322, the handle portion 305 can be peeled from the inner-side ceiling surface 323 of the cap 322 in the state where the inner seal member 306 is not peeled from the container opening 321. At this time, it is not necessary to touch the inner seal member 306 or the handle portion 305.

In the case where the container opening 321 has a screw portion 325, since torsion moment acts in the rotation direction of the cap 322 upon separating the cap 322, it is possible to peel the inner-side ceiling surface 323 of the cap 322 from the handle portion 305 by means of the action.

In addition, the cap 322 may be mounted to the container opening 321 by means of a fitting operation or an adhering operation, and may be separated therefrom by pulling up or pushing up the cap 322 from the container opening 321.

Further, the cap 322 may have an annular thin portion or the like, and only the front end portion of the cap 322 may be removed by fracturing the thin portion so that the container opening 321 and the inner seal member 306 sealing the container opening are exposed.

When the width w of the exposed portion 308 is adjusted, it is possible to adjust the melt-fixing strength so that the inner-side ceiling surface 323 of the cap 322 is peeled from the handle portion 305 in the vicinity of a position where the handle portion 305 rises by several mm or more.

The width w of the exposed portion 308 is dependent on the diameter or the like of the container opening 321, but for example, may be equal to or more than 0.5 mm and equal to or less than 3 mm or so.

In addition, in the embodiment, as shown in FIGS. 27A to 27C, the exposed portion 308 of the sealant layer 302b is formed in such a manner that the end portion 301s in the width direction of the first base 301 is formed in a linear shape and the second base 302 protrudes outward from the first base 301.

Alternatively, it is possible to form the exposed portion 308 of the sealant layer 302b of the second base 302 in such a manner that a notch-shaped concave portion is provided in the end portion 301s in the width direction of the first base 301 and is laminated on the second base 302.

The shape of the exposed portion 308 formed by the notch-shaped concave portion may be an arbitrary shape such as a triangular shape, a square shape, a U-shape, or a V-shape, and is not limited to a particular shape.

In the inner seal member 306 shown in FIGS. 26A to 26C, since the third base 303 includes the high-frequency heating layer 303a, the high-frequency sealing process can be performed just by directly placing only the inner seal member 306 on the container opening 321.

In the case where the inner seal member according to the ninth and eleventh embodiments does not include the high-frequency heating layer, a method may be used which places other bases including the high-frequency heating layer before placing the inner seal member on the container opening so that the other bases including the high-frequency heating layer are interposed between the inner seal member and the container opening; places a fourth base formed in the same shape as the punching shape of the inner seal member and having sealant layers formed on both surfaces thereof and the high-frequency heating layer formed therein; places the inner seal member thereon; mounts the cap to the container opening again; and seals a gap between the inner seal member and the fourth base and a gap between the fourth base and the container opening through the high-frequency heating process in the state where the inner seal member and the fourth base come into press contact with the container opening in the inside of the cap.

Even in this method, it is possible to melt-fix the front end of the handle portion to the inner-side ceiling surface of the cap through the sealant layer exposed to the exposed portion.

As a method of placing the fourth base and the inner seal member on the opening of the container, desirably a method may be used which sequentially loads the inner seal member having the handle portion facing downward and the fourth base in the inside of the cap in advance, and mounts the cap loaded with the inner seal member and the fourth base to the opening of the container.

According to this method, it is possible to easily perform the method using an automatic machine compared with a method which places the fourth base and the inner seal member on the peripheral edge of the opening of the container and mounts the cap thereto.

Herein, the example of the method of manufacturing the inner seal member 306 according to the ninth embodiment will be described with reference to FIGS. 27A to 27C. In the method according to the embodiment, first, the first and second bases 301 and 302 respectively formed of elongated films respectively having the sealant layers 301b and 302b formed on one surfaces thereof, and the third base 303 formed of an elongated film having the sealant layer 3b formed on at least one surface thereof are prepared.

All the first to third bases 301, 302, and 303 are prepared in a roll shape, and are desirably used by sending out the bases. Regarding the third base 303, one sheet which is continuous in the width direction may be prepared. Regarding the first and second bases 301 and 302, certain sheets are provided in accordance with the number of one chamfered portion or plural chamfered portions.

Next, as shown in FIG. 27A, a part of the end portion of the second base 302 is interfolded along the folding line 302c extending in the flow direction thereof so that the surface of the sealant layer 302b is the outside of the interfolded portion, and the second base 302 is inserted between the first base 301 and the third base 303 so as to overlap with each other, thereby sealing the first to third bases 301, 302, and 303 to each other.

As a method of sealing the base, heat sealing (thermal sealing), ultrasonic sealing, high-frequency sealing, or the like may be used. Among them, the heat sealing is desirable.

In addition, when a heat sealing operation is performed by using a hot plate in the sealing process, in order to prevent the outward protruding sealant layers of the first to third bases from being melt-fixed to the hot plate or the like, it is desirable that a film (a polyethylene terephthalate (PET) film, a nylon film, a film or sheet treated by fluorine or silicon, or the like) which is not melt-fixed to the sealant layer be interposed.

When an elongated film which is the same as the first to third bases is used as the film which is not melt-fixed to the sealant layer, it is possible to transport the film together with the bases in an overlapping state before sealing means. As shown in the sectional view in FIG. 27B, it is possible to obtain a laminated structure 304 by the sealing of the first to third bases 301, 302, and 303.

Next, as shown in FIG. 27B, at the time when the laminated structure 304 of the first to third bases 301, 302, and 303 formed by the sealing process is punched in a predetermined shape, the punching process is performed so that the end portion 301s of the first base 301 and the folding line 302c of the second base 302 are included in a punching area 307, thereby manufacturing the handle portion 305 formed by the sealed portions of the first base 301 and the second base 302.

Accordingly, as shown in FIG. 27C, it is possible to obtain the inner seal member 306 in which the sealant layer 302b is exposed to the front end of the handle portion 305.

In the case where the container opening sealed by the inner seal member is provided in a cylindrical portion formed to have the opening in the front end thereof, it is desirable that the shape punching the inner seal member be formed to have a diameter substantially equal to an outer diameter of the cylindrical portion so that the outward protruding amount thereof is as small as possible.

In addition, in the case where the opening of the container sealed by the inner seal member is opened in a flat wall surface, it is desirable that the punching shape be formed to have a size in which a sealing width is ensured on the outside of the opening of the container.

In addition, herein, although the punching process is performed on the center of the folding line 302c so that the folding line 302c of the second base 302 is equal to the diameter of the circular portion of the inner seal member 306 upon permanufacturing the punching process, the punching process may be performed on a biased portion so that an area of the handle portion 305 is larger or smaller than a half of an area of the circular portion.

Further, herein, the punching shape is circular, but may be other shapes, that is, a polygonal shape such as an oval shape, a square shape, or a hexagonal shape.

The shape may be formed in such a manner that the inner seal member 306 is formed by punching the laminated structure 304 and a part of the outer peripheral portion of the handle portion 305 is removed. However, since the inner seal member is loaded in the inside of the cap at the same time upon permanufacturing the punching process or immediately after permanufacturing the punching process, it is desirable that the shape which can be loaded in the inside of the cap be formed upon permanufacturing the punching process without particularly manufacturing the shape.

As shown in FIGS. 28A and 28B, an inner seal member 316 according to the tenth embodiment of the invention has the handle portion 315 formed in a shape not protruding from the container opening 321. The handle portion 315 is formed by laminating a part of the first base 311 with one-side portion 312d of the second base 312 divided into two portions 312d and 312e by the folding line 312c. In addition, the second base 312 has the compressive strength using the ring crush method prescribed in JIS P8126 larger than that of the first base 311. The compressive strength of the second base 312 having the folding line 312c is larger than that of the first base 311.

Accordingly, as shown in FIG. 28B, upon separating the cap 322 of the container having the cap in which the inner seal member 316 is sealed to the container opening 321, the second base 312 acts in a direction of reliving the compressive deformation caused by the operation of interfolding the folding line 312c, thereby allowing the handle portion 315 to stand up. Accordingly, since the handle portion 315 stands up just by separating the cap 322, it is easy to grip the handle portion 315 in the case of separating the inner seal member 316 from the container opening 321.

The method of sealing the inner seal member 316 to the container opening 321 according to the tenth embodiment of the invention may be the same as the method of sealing the inner seal member 306 through the high-frequency sealing process according to the ninth embodiment. Alternatively, a method may be used which seals the inner seal member 316 to the container opening 321, loads the cap 322 to the container opening 321, and performs a sealing process such as a heat sealing process or an ultrasonic sealing process.

In the case of the inner seal member 316 according to the embodiment, since it is not necessary to melt-fix the front end of the handle portion 315 to the inner-side ceiling surface 323 of the cap 322 and it is possible to seal the inner seal member 316 to the container opening 321 before mounting the cap 322 to the container opening 321, it is not necessary to provide the annular protrusion 324 shown in FIG. 26B for pressing the inner seal member to the container opening 321.

In the same manner as the inner seal member 306 according to the ninth embodiment, in the case of mounting the cap 322 to the container opening 321 and sealing the inner seal member 316 according to the tenth embodiment to the container opening 321 through the high-frequency sealing process, it is desirable to use the cap 322 having the annular protrusion 324.

Here, an example of the method of manufacturing the inner seal member 316 according to the tenth embodiment will be described with reference to FIGS. 29A to 29C.

In the method of manufacturing the inner seal member according to the embodiment, first, the first and second bases 311 and 312 respectively formed of elongated films respectively having the sealant layers 311b and 312b formed on one surfaces thereof and the third base 313 formed of an elongated film having the sealant layer 313b formed at least on one surface thereof are prepared.

All the first to third bases 311, 312, and 313 are prepared in a roll shape, and are desirably used by sending out the bases. Regarding the first and third bases 311 and 313, one sheet which is continuous in the width direction may be prepared. Regarding the second base 312, certain sheets are prepared in accordance with the number of one chamfered portion or plural chamfered portions.

Next, as shown in FIG. 29A, a part of the end portion of the second base 312 is interfolded along the folding line 312c extending in the flow direction thereof so that the surface of the sealant layer 312b is the outside of the interfolded portion, and the second base 312 is inserted between the first base 311 and the third base 313 so as to overlap with each other, thereby sealing the first to third bases 311, 312, and 313 to each other.

As a method of sealing the base, heat sealing (thermal sealing), ultrasonic sealing, high-frequency sealing, or the like may be used. Among them, the heat sealing is desirable.

In addition, when a heat sealing operation is performed by using a hot plate in the sealing process, in order to prevent the outward protruding sealant layers of the first to third bases from being melt-fixed to the hot plate or the like, it is desirable that a film (a polyethylene terephthalate (PET) film, a nylon film, a film or sheet treated by fluorine or silicon, or the like) which is not melt-fixed to the sealant layer be interposed.

When an elongated film which is the same as the first to third bases is used as the film which is not melt-fixed to the sealant layer, it is possible to transport the film together with the bases in an overlapping state before sealing means. As shown in the sectional view in FIG. 29B, it is possible to obtain a laminated structure 314 by the sealing of the first to third bases 311, 312, and 313.

Next, as shown in FIG. 29B, at the time when the laminated structure 314 of the first to third bases 311, 312, and 313 formed by sealing process is punched in a predetermined shape, the punching process is preformed so that the folding line 312c of the second base 312 is included in the punching area 317, thereby manufacturing the handle portion 315 formed by the sealed portions of the first base 311 and the second base 312. Accordingly, as shown in FIG. 29C, it is possible to obtain the inner seal member 316 having the handle portion 315.

Since the shape or dimension of the laminated structure 314 and the shape of the handle portion 315 subjected to the punching process can be formed at the same time when the inner seal member 306 is formed by punching the laminated structure 304 according to the ninth embodiment, the respective description thereof will be omitted.

As shown in FIGS. 26A to 26C, the inner seal member 306 according to the eleventh embodiment has the handle portion 305 formed in a shape not protruding from the container opening 321. The handle portion 305 is formed by laminating a part of the first base 301 on the one-side portion 302d of the second base 302 divided into two portions 302d and 302e by the folding line 302c. The second base 302 has the compressive strength using the ring crush method prescribed in JIS P8126 larger than that of the first base 1. In addition, the second sealant layer 302b manufacturing the handle portion 305 is exposed to a part 308 of the front end of the handle portion 305.

In the inner seal member 306 according to the embodiment, the handle portion 305 is formed by laminating a part of the first base 301 on the one-side portion of the second base 302 which is divided into two portions 302d and 302e by the folding line 302c. A part of the sealant layer 302b of the second base 302 as the folding-side portion is exposed to the front end of the handle portion 305.

In addition, as described in the ninth embodiment, a part of the sealant layer 301b of the first base 301 which is not the folding-side portion may be exposed to the front end of the handle portion 305, but it is desirable that the sealant layer 302b of the second base 302 as the folding-side portion be exposed to the front end of the handle portion 305.

The method of sealing the inner seal member according to the eleventh embodiment of the invention to the container opening is the same as the method of sealing the inner seal member 306 according to the ninth embodiment through the high-frequency sealing process according to the ninth embodiment.

As shown in FIGS. 26B and 26C, upon permanufacturing the high-frequency sealing process, the front end of the handle portion 305 is melt-fixed to the inner-side ceiling surface 323 of the cap 322 through the sealant layer 302b exposed to the exposed portion 308.

Accordingly, as shown in FIG. 26B, upon separating the cap 322 of the cap attachment container in which the inner seal member 306 is sealed to the container opening 321, the cap 322 is lifted up together with the front end of the handle portion 305.

In addition, since the compressive strength of the second base 312 is larger than that of the first base 311, the second base 312 relives the compressive deformation caused by the operation of interfolding the folding line 312c, and hence the compressive strength acts in a direction in which the handle portion 315 stands up.

Accordingly, since the handle portion 305 stands up just by separating the cap 322, it is easy to grip the handle portion 5 in the case of separating the inner seal member 306 from the container opening 321.

The method of manufacturing the inner seal member according to the eleventh embodiment of the invention is the same as the method of manufacturing the inner seal member 306 according to the ninth embodiment except that the second base 302 provided with the exposed portion 308 of the sealant layer 302b has the compressive strength larger than that of the first base 301.

In addition, in the case of manufacturing the inner seal attachment container using the inner seal member according to the ninth to eleventh embodiments, a fifth base having both sealable surfaces may be interposed between the inner seal member and the container opening, and the inner seal member may be placed thereon.

In this case, the inner seal member having the handle portion facing downward and the fifth base having both sealable surfaces are sequentially loaded in the inside of the cap, the cap in which the fifth base is loaded on the inner seal member is mounted to the container opening, and then the high-frequency induction heating process is performed in the state where the inner seal member comes into press contact with the container opening in the inside of the cap.

Accordingly, a gap (a gap between the lower surface of the inner seal member and the upper surface of the fifth base and a gap between the lower surface of the fifth base and the peripheral edge of the container opening) from the inner seal member to the container opening is sealed mutually by the heat generated from the high-frequency heating layer.

The fifth base is formed of a sealable member such as a thermoplastic resin, but particularly, it is desirable that seal strength between the fifth base and the peripheral edge of the opening of the container be strong. Accordingly, after separating the seal film by gripping the handle portion, the fifth base is left on the side of the peripheral edge of the opening of the container.

The fifth base may be provided with an opening having a polygonal shape, a star shape, or a circular shape or an opening having plural holes and a meshed shape. Accordingly, it is possible to control the flow of the contents poured out from the container by using the opening.

For example, in the case where the contents are viscous materials such as mayonnaise, a peripheral edge of the opening is formed in an appropriate shape so as to pour out the contents from the container in the state where the sectional shape thereof is formed in a particular shape such as a star shape.

INDUSTRIAL APPLICABILITY

The seal film and the inner seal member formed by the invention may be used as the seal for the container and/or the cap attachment container, and may be applied to various contents such as food, drink, spices, and medical supplies.

What is claimed is:

1. A device for manufacturing a seal film comprising:
   an interfolding assisting plate which supports a first base formed of an elongated film having a sealant layer formed on one surface thereof;

an interfolding plate which comes into contact with the first base at a position deviated from the interfolding assisting plate in the state where the first base follows the interfolding assisting plate so that the first base is interfolded to have an S-shaped, Z-shaped, or Ω-shaped interfolding shape in a sectional view in a flow direction of the first base;

sealing means which overlaps a second base formed of an elongated film having a sealant layer formed on at least one surface thereof with the first base having the interfolding shape so that the sealant layers of both bases face each other and seals the first base to the second base; and punching means which punches a laminated structure, formed by sealing the first and second bases to each other, into a predetermined shape so that a folding line portion of the first base contacting with the second base is included in a punching area and forms a handle portion formed by the sealed portion of the first base;

wherein the interfolding assisting plate is configured so that a width of the interfolding assisting plate is variable; and the interfolding plate is configured to be movable.

2. The device for manufacturing a seal film according to claim 1, wherein the interfolding plate is a rotary disk.

3. The device for manufacturing a seal film according to claim 1, wherein the interfolding plate and the interfolding assisting plate are horizontally provided over the ground.

4. A device for manufacturing a seal film comprising:

an interfolding assisting plate which comes into contact with a first base formed of an elongated film having a sealant layer formed on one surface thereof;

an interfolding plate which comes into contact with the first base in the state where the first base follows the interfolding assisting plate and interfolds the first base so as to have an outward mountain-folding shape in the width direction in a sectional view in a flow direction of the first base;

first sealing means which seals a folding back portion having the mountain-folding shape and forms a sealed portion of the first base;

a folding back plate which comes into contact with an unsealed portion of an end portion of the first base, folds back a sealed portion of the first base so as to have an outward valley-folding shape in the width direction in a sectional view in a flow direction of the first base, and then allows the first base so as to have an S-shaped, Z-shaped, or Ω-shaped interfolding shape in the sectional view in the flow direction of the first base;

second sealing means which overlaps a second base formed of an elongated film having a sealant layer formed on at least one surface thereof with the first base having the interfolding shape so that the sealant layers of both bases face each other and seals the first base to the second base; and punching means which punches a laminated structure, formed by sealing the first and second bases to each other, into a predetermined shape so that a folding line portion of the first base contacting with the second base is included in a punching area and forms a handle portion formed by the sealed portion of the first base;

wherein the interfolding assisting plate is configured so that a width of the interfolding assisting plate is variable.

5. The device according for manufacturing a seal film to claim 4, wherein the interfolding plate and the interfolding assisting plate are horizontally provided over the ground.

* * * * *